(12) United States Patent
Schneider

(10) Patent No.: US 12,453,916 B2
(45) Date of Patent: Oct. 28, 2025

(54) SMART GOLF EYEWEAR AND METHOD OF USE THEREOF

(71) Applicant: Shure Technology Inc., Dover, DE (US)

(72) Inventor: Jason Schneider, Irvine, CA (US)

(73) Assignee: Shure Technology Inc., Irvine, CA (US)

( * ) Notice: Subject to any disclaimer, the term of this patent is extended or adjusted under 35 U.S.C. 154(b) by 0 days.

(21) Appl. No.: 18/924,849

(22) Filed: Oct. 23, 2024

(65) Prior Publication Data

US 2025/0161782 A1    May 22, 2025

Related U.S. Application Data

(60) Provisional application No. 63/600,659, filed on Nov. 18, 2023.

(51) Int. Cl.
  *A63B 71/06*    (2006.01)
  *A63B 24/00*    (2006.01)
  (Continued)

(52) U.S. Cl.
  CPC ...... *A63B 71/0622* (2013.01); *A63B 24/0003* (2013.01); *A63B 69/3605* (2020.08); *G06T 7/246* (2017.01); *G06T 7/50* (2017.01); *G06T 7/73* (2017.01); *A63B 2024/0034* (2013.01); *A63B 2071/063* (2013.01); *A63B 2071/0666* (2013.01); *A63B 2214/00* (2020.08); *A63B 2220/05* (2013.01); *A63B 2220/16* (2013.01); *A63B 2220/30* (2013.01); *A63B 2220/807* (2013.01); *A63B 2220/808* (2013.01); *A63B 2225/50* (2013.01); *G06T 2207/30224* (2013.01); *G06T 2207/30241* (2013.01)

(58) Field of Classification Search
  CPC ............ A63B 71/0622; A63B 69/3605; A63B 24/0003; G06T 7/50; G06T 7/24606; G06T 7/246; G06T 7/73
  See application file for complete search history.

(56) References Cited

U.S. PATENT DOCUMENTS 6,254,492 B1 * 7/2001 Taggett .............. A63B 69/3623
                                          473/219
7,780,542 B1 * 8/2010 Ross .................. A63B 69/3632
                                          473/226

(Continued)

FOREIGN PATENT DOCUMENTS

KR     20170047665 A  *  5/2017

OTHER PUBLICATIONS

KR-20170047665-A machine translation (Year: 2017).*

*Primary Examiner* — Malina D. Blaise
(74) *Attorney, Agent, or Firm* — Innovent Law P.C.; Karima Gulick

(57) ABSTRACT

A golf eyewear including a display, a camera configured to record visual images and generate image data based on the visual images, a processor and a non-transitory machine-readable medium including instructions stored thereon which, when executed by the processor, configure the processor to: generate golf suggestion data based on the image data, wherein the golf suggestion data includes club recommendation and swing path; and display suggestion images on the display based on the suggestion data.

20 Claims, 18 Drawing Sheets

(51) Int. Cl.
*A63B 69/36* (2006.01)
*G06T 7/246* (2017.01)
*G06T 7/50* (2017.01)
*G06T 7/73* (2017.01)

(56) References Cited

U.S. PATENT DOCUMENTS

| | | | | |
|---|---|---|---|---|
| 10,856,744 B2* | 12/2020 | Yuen | ................... | G01C 22/006 |
| 2007/0015611 A1* | 1/2007 | Noble | ................... | A61B 5/1126 |
| | | | | 473/450 |
| 2011/0065530 A1* | 3/2011 | Molinari | ............ | A63B 69/3688 |
| | | | | 473/378 |
| 2012/0236030 A1* | 9/2012 | Border | ................... | G06F 3/013 |
| | | | | 345/633 |
| 2013/0053190 A1* | 2/2013 | Mettler | ............. | A63B 24/0062 |
| | | | | 473/422 |
| 2013/0266918 A1* | 10/2013 | Tinjust | ............... | A63B 24/0087 |
| | | | | 700/91 |
| 2014/0139454 A1* | 5/2014 | Mistry | ................... | G06F 3/017 |
| | | | | 345/173 |
| 2014/0143784 A1* | 5/2014 | Mistry | ................... | G06F 3/0488 |
| | | | | 718/102 |
| 2015/0057107 A1* | 2/2015 | Leech | ................... | A63B 69/36 |
| | | | | 701/523 |
| 2015/0317910 A1* | 11/2015 | Daniels | ................... | G09B 9/00 |
| | | | | 434/257 |
| 2016/0324445 A1* | 11/2016 | Kim | ..................... | A61B 5/6802 |
| 2017/0061817 A1* | 3/2017 | Mettler May | ......... | A61B 5/1124 |
| 2017/0332946 A1* | 11/2017 | Kikkeri | ......... | A61B 5/1114 |
| 2018/0104573 A1* | 4/2018 | Jeffery | ................... | G06F 3/017 |
| 2019/0134506 A1* | 5/2019 | Gupta | ............... | G09B 19/0038 |
| 2019/0371028 A1* | 12/2019 | Harrises | ................ | G02B 27/0101 |
| 2020/0188732 A1* | 6/2020 | Kruger | ................... | G06F 3/0346 |
| 2020/0193864 A1* | 6/2020 | Fang | ..................... | A63B 60/46 |
| 2022/0001236 A1* | 1/2022 | Mooney | .................. | G06F 18/00 |
| 2023/0072423 A1* | 3/2023 | Osborn | ................... | G16H 20/30 |
| 2023/0260552 A1* | 8/2023 | Bose | ....................... | H04N 5/765 |
| | | | | 463/31 |
| 2023/0398427 A1* | 12/2023 | Aksamit | ................ | G06F 3/011 |
| 2024/0033603 A1* | 2/2024 | Peterson | ............... | A63B 69/36 |
| 2024/0042298 A1* | 2/2024 | Choe | ................ | A63B 69/36211 |
| 2024/0325847 A1* | 10/2024 | Peterson | ............ | G09B 19/0038 |

* cited by examiner

SMART GOLF EYEWEAR AND METHOD OF USE THEREOF

CROSS REFERENCE TO RELATED APPLICATIONS

The present application claims benefit of U.S. Provisional Application. No. 63/600,659 filed Nov. 18, 2023, entitled "SMART GOLF EYEWEAR AND METHOD OF USE THEREOF."

BACKGROUND OF THE DISCLOSURE

1. Field of the Disclosure

The present disclosure relates generally to a smart golf eyewear and more particularly, a device adapted to improve a golfer's performance in addition to conveying golf-related information via smart eyewear.

2. Description of the Related Art

In markets today, there are very limited products offered for real time improvement of a golfer's game.

Currently, there are no useful alternatives that effectively assist a golfer to improve their game in real time while providing accurate feedback as they are executing a play. As will be disclosed below, the present disclosure addresses these needs and covers a device and method to aid a golfer improve their game while conveying accurate and real time golf related information to prevent these inconveniences and solve these issues.

BRIEF DESCRIPTION OF THE DRAWINGS

It should be noted that the drawing figures may be in simplified form and might not be to precise scale.

The same elements or parts throughout the figures of the drawings are designated by the same reference characters, while equivalent elements bear a prime designation.

DETAILED DESCRIPTION OF THE DISCLOSURE

Figure 1:
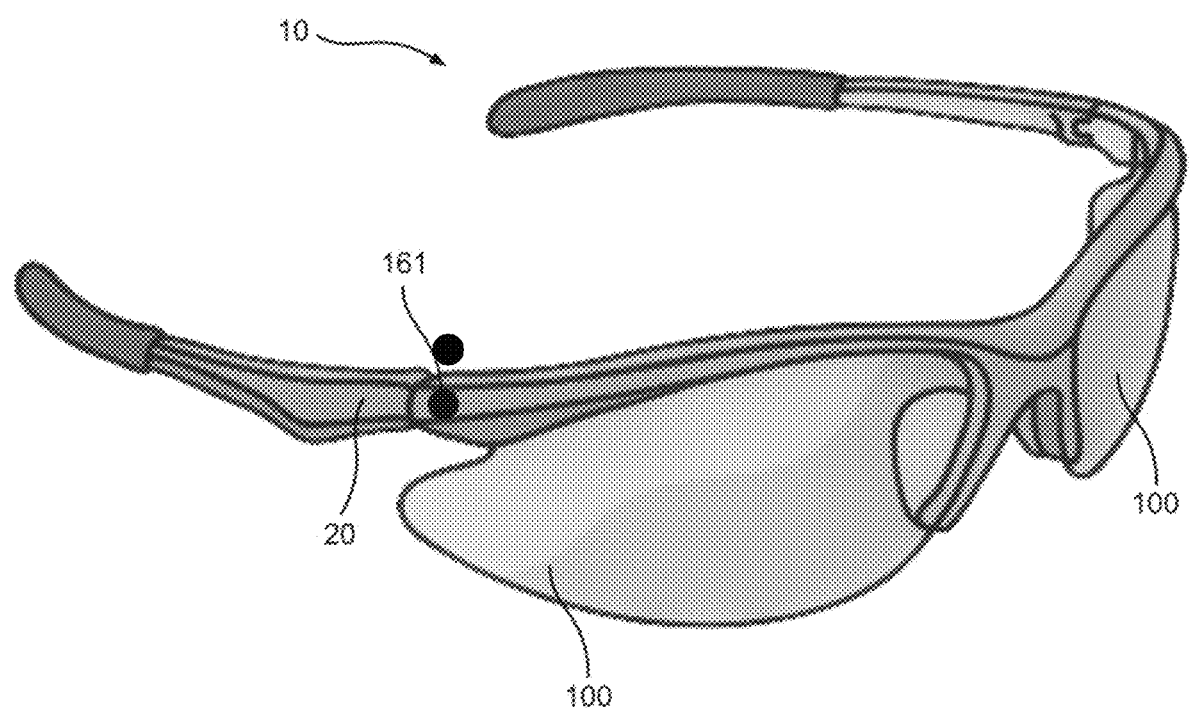
FIG. 1 is a perspective view of the smart golf eyewear according to a first embodiment and configured to be worn on a person's head.

The embodiment and various embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

A smart sport eyewear includes a near-eye, augmented reality (AR) display that enhance performing a sport by displaying virtual data on said display. Some examples of sports are running, golf, basketball, baseball, swimming, etc. A user of the smart sport eyewear may be playing with real sport equipment or virtual sport equipment displayed by the AR display. Furthermore, a user may be performing a sport at a real sport performance location like a real golf course, a real golf range, a real basketball court, or a real physical location like a neighborhood for a run. A user may also be performing a sport in the context of a virtual sport performance area which may be displayed by the smart sport eyewear or by other display devices. Avatars for presenting a performance or for interaction with the user may be displayed as well.

In some embodiments, the smart sport eyewear provides a physical sport movement recommendation for a user based on a current context in a sport performance session and user skills data. Some examples of information a physical sport movement recommendation may include are what piece of sports equipment to use, a direction of aim, a suggested body movement (e.g. duck, run), a position on a field or court at which to perform the movement, and a strength to use for a movement. A user's physical sport movement may also be tracked and analyzed for updating skills data for the user.

A user using a near-eye, AR display sees virtual objects displayed together with real objects in real time. In particular, a user wearing an optical see-through, augmented reality display device actually sees with his or her natural sight a real object, which is not occluded by image data of a virtual object or virtual effects, in a display field of view of the see-through display, hence the names see-through display and optical see-through display. References to a see-through display below are referring to an optical see-through display.

Image data may be moving image data like video as well as still image data. Image data may also be three dimensional. An example of 3D image data is a hologram or silhouette. Image data may be the captured images of real objects and may be generated to illustrate virtual objects or imagery. Virtual image data, referred to hereafter as virtual data, is image data of a virtual object or virtual effect. An example of a virtual effect is an environmental condition like fog or rain. Another example of a virtual effect may be a simulated effect on a real object, like a smashing of a window when the real is still intact, or a displayed change of color of one's shirt.

Virtual data is seen through a near-eye, augmented reality (AR) display of the smart sport eyewear from a user perspective which is not predefined as the display moves with user movements. The display field of view approximates a user field of view as seen from a user perspective (where a user is looking from). A user perspective may be associated with a display field of view. A user perspective may be approximated with varying degrees of accuracy. For example, a predetermined approximation of a user perspective may be associated with a near-eye AR display without reference to specific user data. In other examples, more sophisticated techniques may use individual gaze determined from eye tracking data to more precisely pinpoint from where a user is looking. In some embodiments, a user perspective of an object, real or virtual, is determined from a position and orientation of the object in the display field of view.

In some embodiments, the display field of view, may be mapped by a view dependent coordinate system, having orthogonal X, Y and Z axes in which a Z-axis represents a depth position from a reference point on the smart sport eyewear.

FIG. 1 is a perspective view of the smart golf eyewear 10 according to a first embodiment of the present disclosure and configured to be worn on a person's head. As shown in FIG. 1, the smart golf eyewear 10 may include a body 20 and a pair of displays 100 attached to the body 20 and that serving as eyeglasses. For example, the smart golf eyewear 10 may include any of the head mounted displays described in U.S. Pat. No. 7,595,933, entitled Head Mounted Display System, issued to Tang on Sep. 29, 2009, the disclosure of which is hereby incorporated by reference in its entirety. In the first embodiment, the displays 100 are transparent LCDs using a similar principle to traditional LCDs and modified with polarizers and other components to allow light to pass through. The liquid crystals of the displays 100 are manipulated to either block or allow light through when the display is active. In different embodiments, the displays 100 also include light-emitting diode (LED) screens, organic light-emitting diode screens, electroluminescent displays, and other see-through displays or transparent display that allows the user to see what is shown on the displays 100 while still being able to see through it.

Figure 2:
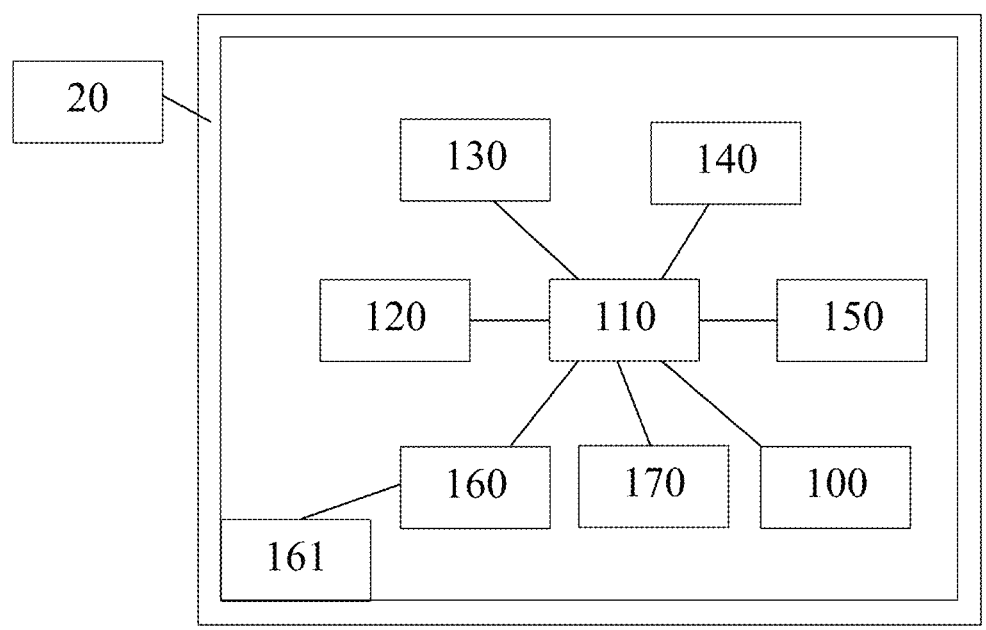
FIG. 2 is a block diagram of the smart golf eyewear according to the first embodiment of the present disclosure.

FIG. 2 is a block diagram of the smart golf eyewear 10 according to the first embodiment of the present disclosure. The smart golf eyewear 10 includes the displays 100, a processor 110, a data storage 120, a wireless module 130, a microphone 140, a speaker 150, and a camera module 160 preferably disposed in the body 20. In the present embodiment, the displays 100, data storage 120, wireless module 130, microphone 140, speaker 150, and camera module 160 are all electrically connected to the processor 110. The camera module 160 further includes a camera lens 161 attached to the body 20 and above the display 100 (also illustrated in FIG. 1). The processor 110 may be embodied as one or multiple digital computers, data processing devices, and/or digital signal processors (DSPs), which may have one or more microcontrollers or central processing units (CPUs), read only memory (ROM), random access memory (RAM), electrically-erasable programmable read only memory (EEPROM), high-speed clock, analog-to-digital (A/D) circuitry, digital-to-analog (D/A) circuitry, input/output (I/O) circuitry, and/or signal conditioning and buffering electronics. The processor 110 may further be associated with computer readable non-transitory memory having stored thereon instructions that cause the processor 110 to provide an informational display to a user via the displays 100.

The camera module 160 captures and records images from the user's viewpoint. The camera module 160 may include any suitable type of camera selected based on a variety of factors. For example, the type of camera can be selected based on the type of see-through display selected for the displays 100. In one embodiment, the camera module 160 may be directly mounted on the body 20. In another embodiment, the camera module 160 may be placed inside the body 20 with the camera lens 161 exposed through an opening on the body 20. FIG. 1 shows the camera lens 161 as being mounted so that it will be positioned above the user's right eye when a user wears the smart golf eyewear 10. In other embodiments, the camera lens 161 may be positioned in any other suitable location on the smart golf eyewear 10. Further, the location of the camera module 160 may be selected based on a number of factors. For example, the location of the camera module 160 may be selected to provide the camera lens 161 in a position close to the user's eye so that the view from the camera lens 161 is similar to the view from the user's eye.

In the embodiment illustrated in FIG. 2, the smart golf eyewear 10 further includes at least one input button 170 for the user to manually press to send information such as instruction or confirmation to the processor 110. For instance, in one embodiment (such as the one illustrated in FIG. 5), once a golf ball is in an optimal position to be locked in and the smart golf eyewear 10 recognizes the golf ball, the user can also manually press the input button 170. This allows the smart golf eyewear 10 system to recognize the golf ball, ensure that it is at an optimal position for the user, and/or keep track of the golf ball once the user starts playing and moving the golf ball around the golf course.

In the first embodiment, the data storage 120 is a magnetic, optical or mechanical media that records and preserves digital information for ongoing or future operations. In the first embodiment, the data in the data storage 120 includes historic player statistics such as scoring average, fairway hit, greens in regulation, putts per round, driving distance, driving accuracy, and scrambling, etc. The data also includes course data such as yardage, par, course rating, slope rating, etc. The data further includes equipment data such as club specifications (such as make, model, club loft angles, and shaft materials) and ball specifications (such as ball compression, spin rate, and construction). The data storage 120 also stores information related to the user such as physical characteristics (height, weight, age, etc.).

As illustrated in FIG. 2, the processor 110 is electrically connected to the data storage 120 and is programmed to store data such as information related to the most recent golf club swing in the data storage 120 for future reference. The processor 110 is also programmed to make recommendation based on the data stored in the data storage 120 and data generated by other part of the smart golf eyewear 10. For example, the processor 110 may make recommendation regarding choice of golf club based on the history performance of the user stored in the data storage 120 and the image data generated by the camera module 160, which will be further explained below.

The wireless module 130 is a device or component that enables wireless communication between electronic devices. The wireless module 130 can support different communication standards and protocols, depending on the needs of the smart golf eyewear 10. The wireless module 130 includes Wi-Fi Modules configured to connect to a wireless network, Bluetooth Modules for facilitating short-range communication between devices, Zigbee Modules used for low-power, low-data-rate applications, LoRa (Long Range) Modules designed for long-range, low-power communication over several kilometers with minimal power consumption, Cellular Modules for providing connectivity over cellular networks such as GSM, LTE, NFC (near-field communication) Modules that performs near-field communication for tasks like contactless payments or data exchange between devices in close proximity, and RF Modules operating on various frequencies and used for custom wireless communication needs. In the first embodiment, the wireless module 130 is programmed to receive location information related to golf such as GPS data on a particular golf course or GPS data on the user's current location. The processor 110 can then present the received data on the displays 100 or make recommendation (such as choice of golf club) based on the received data.

In the first embodiment, the user can create a user profile using an application in an electronic device such as smart phones, laptop computer, or desktop computer. The user profile includes information related to the user and his/her golf performance, such as name, age, height, handicap information, average club distance etc. The user can then send the information of said user profile to the wireless module 130 to be stored in the data storage 120 or a remote server.

The microphone 140 converts sound waves into electrical signals. In the first embodiment, the microphone 140 converts voice of the user into electrical signals to be sent to the processor 110. The processor 110 then determines if the electrical signals constitute command by the user and if so execute on said command. For instance, the user can voice his/her wish for the displays 100 to present certain data on the displays 100 using the microphone 140. The processor 110 can process the electrical signals to determine the data requested by the user, determine if the requested data is available locally in the data storage 120 or in a remote server, and then retrieve the requested data either directly from the data storage 120 or indirectly from the remote server using the wireless module 130. On the other hand, the speaker 150 converts electrical signals into sound waves. In the first embodiment, the speaker 150 receives data from the processor 110 and then converts said data into voice or sound. For example, the processor 110 can receive voice data from a golf coach located remotely using the wireless module 130 and then use the speaker 150 to generate voices of the golf coach based on said voice data.

Figure 3:
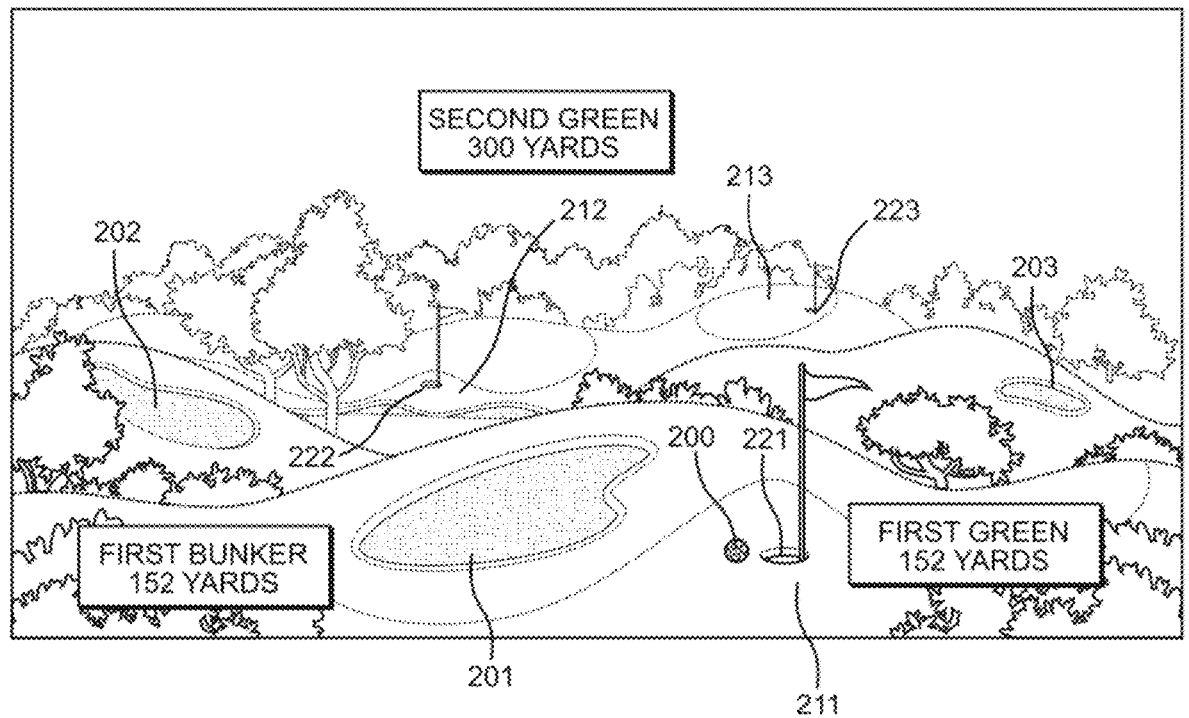
FIG. 3 is a schematic view of the golf course seen through the displays according to the first embodiment.

Range Finder Mode:

The camera module 160 is programmed to capture and record images similar to the user's real world view through the displays 100. The processor 110 then processes the images to determine the objects in the images. FIG. 3 is a schematic view of the a golf course seen through the displays 100 according to the first embodiment. FIG. 3 also represents the image of the golf course captured by the camera module 160. Firstly, the processor 110 processes the image to determine the objects on and the various parts of the golf course in the image such as the golf ball 200, a first bunkers 201, a second bunker 202, a third bunker 203, a first green 211, a second green 212, a third green 213, a first hole 221, a second hole 222, and a third hole 223. The processor 110 can also determine other parts of the golf course such as water hazard and rough if they appear in the image capture by the camera module 160.

Once the processor 110 determines the important parts of golf course captured in the image, it can use the GPS information associated with the user and the golf course to calculate the distance between the user and said important parts of golf course. For example, the GPS information regarding the area and location of the first bunker 201 may be stored locally in the data storage 120 or in a remote server. On the other hand, the GPS location of the user is preferably located in a remote server. The processor 110 can retrieve GPS information of both the first bunker 201 and the user using either from the data storage 120 or using the wireless module 130. The processor 110 can then use said GPS information to calculate distance between the user between the center, front edge, and back edge of the first bunker 201. As illustrated in FIG. 3, the processor 110 can then send the distance information to the displays 100 to show the user in real time the distance between the user and the various parts of the first bunker 201. The processor 110 can also store the above-mentioned distance information in the data storage 120 for future reference.

Figure 4:
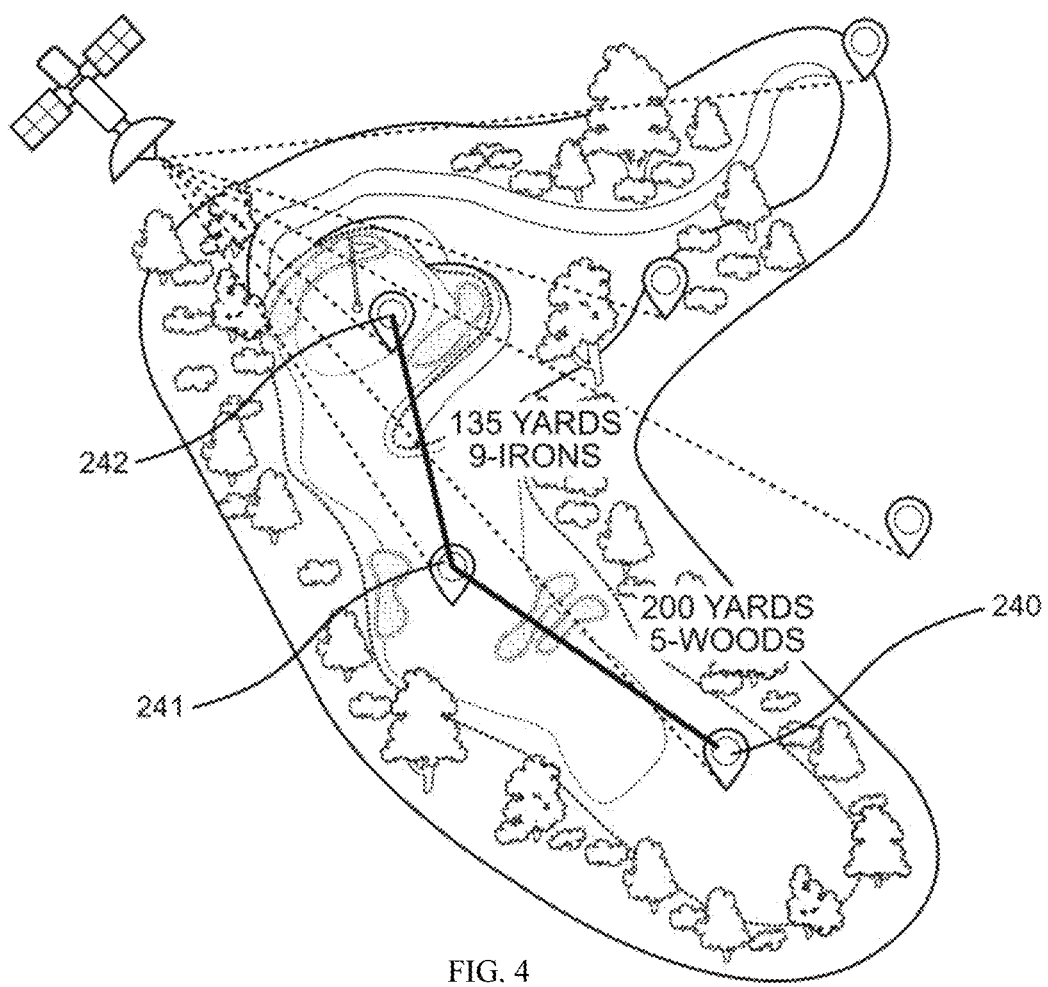
FIG. 4 is a schematic bird's eye view of a golf course saved in the data storage according to the first embodiment.

Golf Course Bird View Display:

The processor 110 can also present the GPS information of the golf course directly on the displays 110 for the user's reference. FIG. 4 is a schematic bird's eye view of a golf course saved in the data storage 120 in the first embodiment. FIG. 4 shows the user's location 240, location of the fairway 241, and a green location 242. The processor 110 can make a club recommendation for the user to make the approach shot to the hole (e.g. 9 iron club as illustrated in FIG. 4). The processor 110 can then present the image of FIG. 4 on the displays 100 to inform the user of the distance between the above-mentioned locations and the recommended club.

Figure 5:
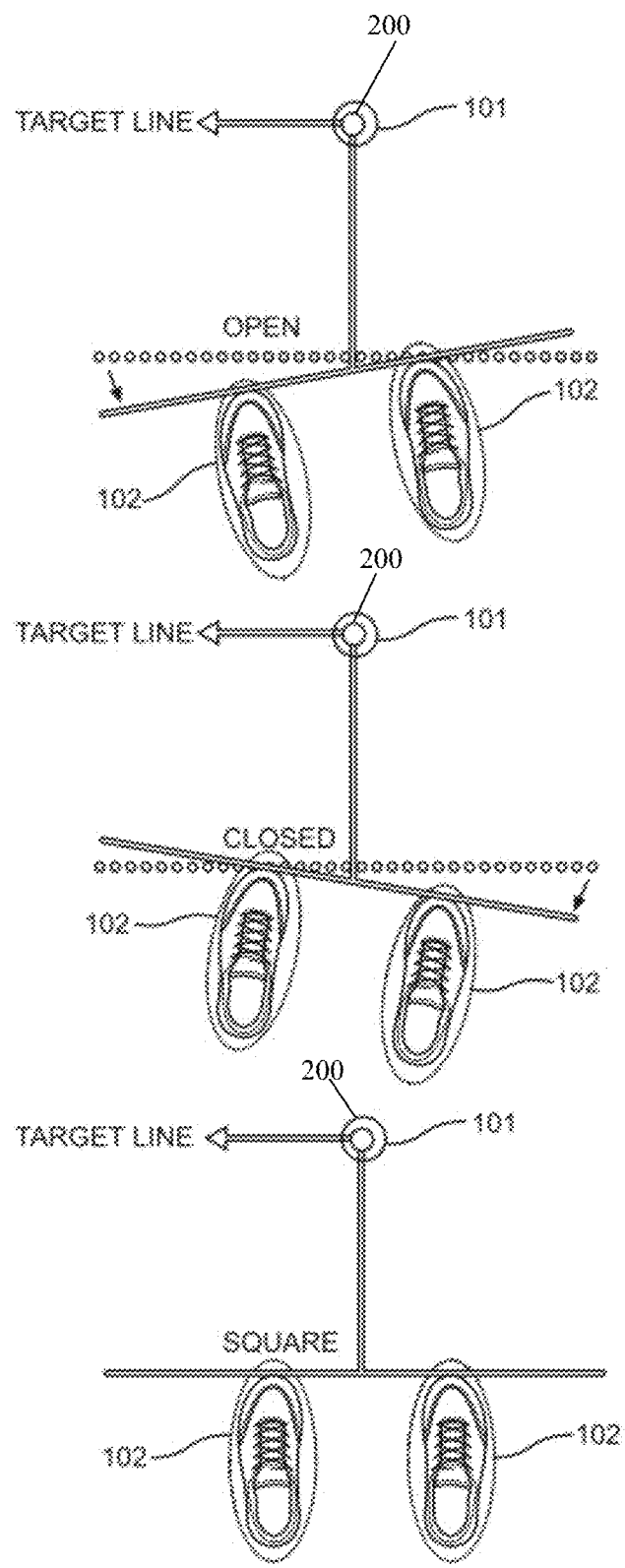
FIG. 5 is a schematic view showing various golf stances of the user relative to a golf ball.

Ball Locking Mode and Stance Tracking/Correction:

The smart golf eyewear 10 can also be used to analyze the golf stance of the user relative to the golf ball and recommend adjustment to the golf stance based on the golf club used. FIG. 5 is a schematic view showing various golf stances of the user relative to a golf ball 200. Firstly, the processor 110 may require the user to align the golf ball with a hologram or silhouette presented on the displays 110 to create a base point for the later stance adjustment. In the present embodiment, the smart golf eyewear 10 can first present a red circle hologram 101 on the displays 110 for the user to align the red circle hologram 101 with the golf ball 200. Once the circle hologram 101 is properly aligned with the golf ball 200 the processor 110 will turn the circle hologram 101 green to show the user that the alignment is complete and the stance tracking can begin. In one embodiment such as the one illustrated in FIG. 5, once the ball 200 is in an optimal position, and the smart golf eyewear 10 recognizes the ball 200, the user can also lock the ball 200 in manually by selecting a button on the smart golf eyewear 10. This allows the smart golf eyewear 10 system to recognize the ball 200, ensure that it is at an optimal position for the user, and/or keep track of the ball 200 once the user starts playing and moving the ball 200 around the golf course.

In yet another embodiment, the user can also give verbal instruction to the processor 110 using the microphone 140. This also allows the smart golf eyewear 10 system to recognize the ball 200, ensure that it is at an optimal position for the user, and/or keep track of the ball 200 once the user starts playing and moving the ball 200 around the golf course.

FIG. 5 also shows the user in an open stance (where your front foot is pulled back relative to the target line, and your back foot is positioned slightly forward.), a closed stance (where your front foot is positioned slightly forward, and your back foot is pulled back relative to the target line), and a square stance (where your feet, hips, and shoulders are aligned parallel to the target line). The processor 110 can make recommendation as to which stance the user should adopt based on factors such as the club type, target line, and the position of the golf ball on the golf course. If the user decide to take the open stance, then the processor 110 can place silhouette 102 on the displays 110 to show the user the recommended locations of the user's feet relative to the golf ball.

Figure 6:
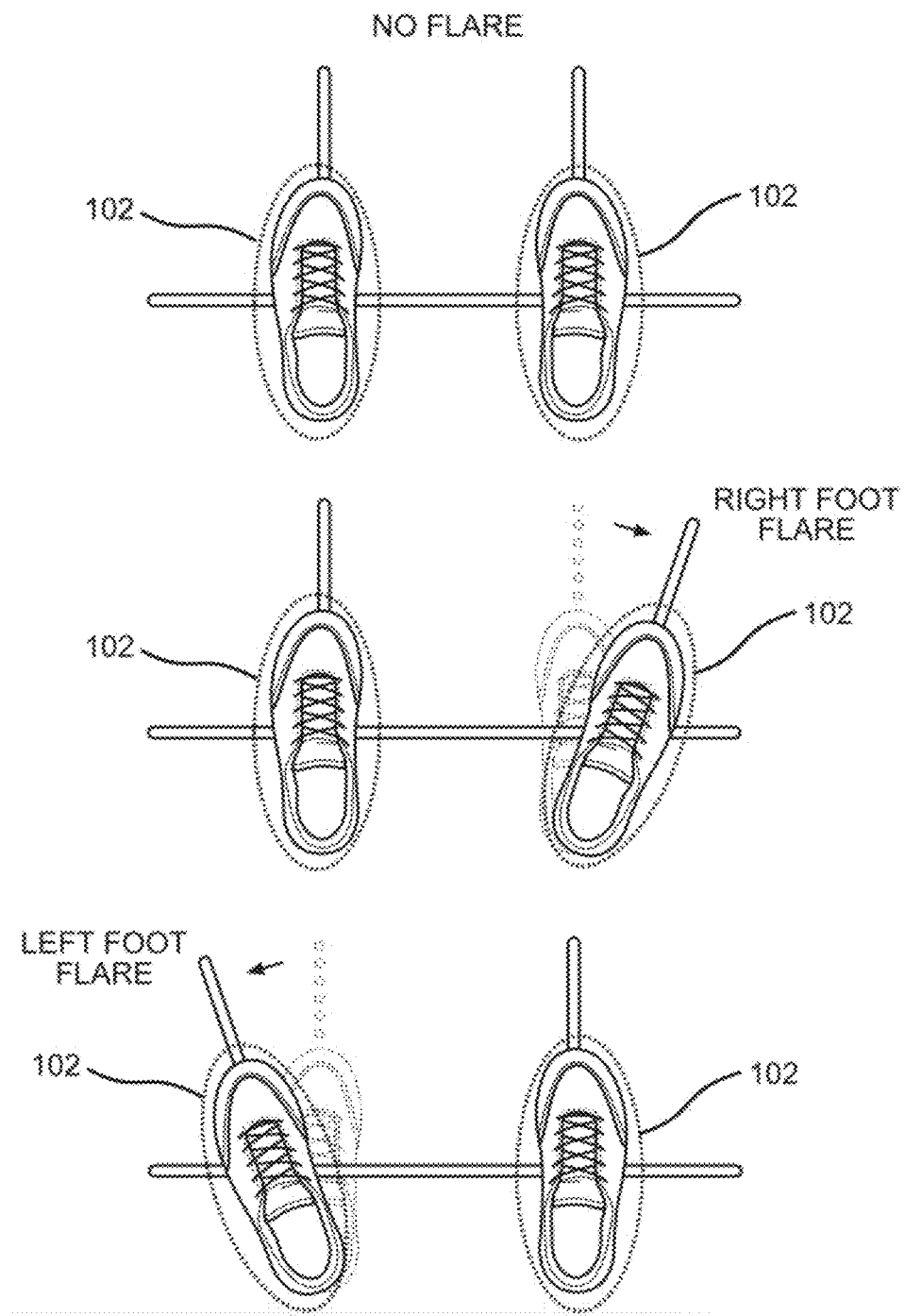
FIG. 6 is a schematic view showing the user in a square stance relative to the golf ball.

The processor 110 is also programmed to help the user adjust part of the stance chosen to optimize the shot. FIG. 6 is a schematic view showing the user in a square stance relative to the golf ball. In the present embodiment, the processor 110 can recommend flaring one foot to help the user rotate his/her body, maintain balance, and improve the swing. For instance, the processor 110 can change the position of the silhouette 102 for one foot on the displays 110 to help the user flaring for approximately 20-30 degrees at the address.

Figure 7:
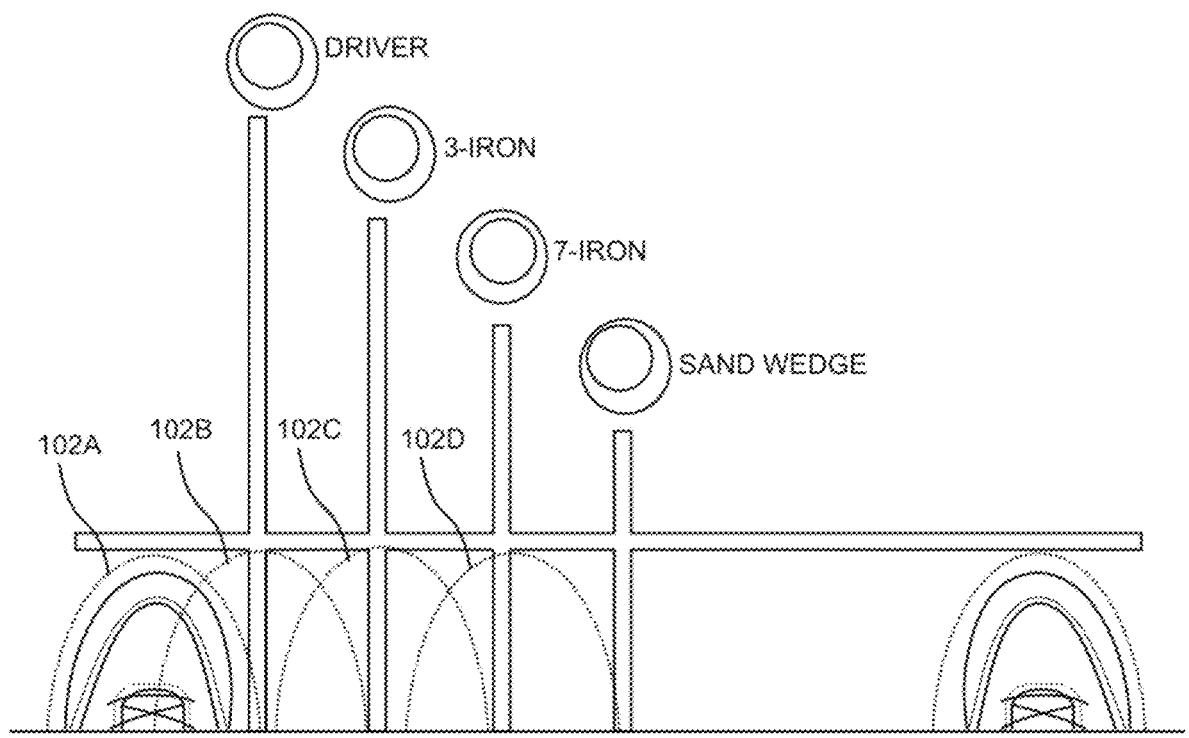
FIG. 7 is a schematic view showing the position of the user's feet relative to the golf ball and the golf club used.

Further, the processor 110 can also help the user adjust the position of the user's feet based on the intended shot and the club used. FIG. 7 is a schematic view showing the position of the user's feet relative to the golf ball and the golf club used. FIG. 7 shows the user in a square stance and various positions of the golf balls based on the club to be used to make the shot. Whenever the user decide to switch to a different golf club, the user can then give verbal instruction to the processor 110 using the microphone 140. FIG. 7 shows a first feet silhouette 102A for the user using a driver club, a second feet silhouette 102B for the user using a 3 Iron club, a third feet silhouette 102A for the user using a 7 Iron club, and a fourth feet silhouette 102D for the user using a Sand Wedge club. After the processor 110 receives the instruction from the user, it can then adjust the position of feet silhouette 102A-D on the displays 100 in order for the user to align his/her feet with the silhouette based on the new golf club used.

Figure 8:
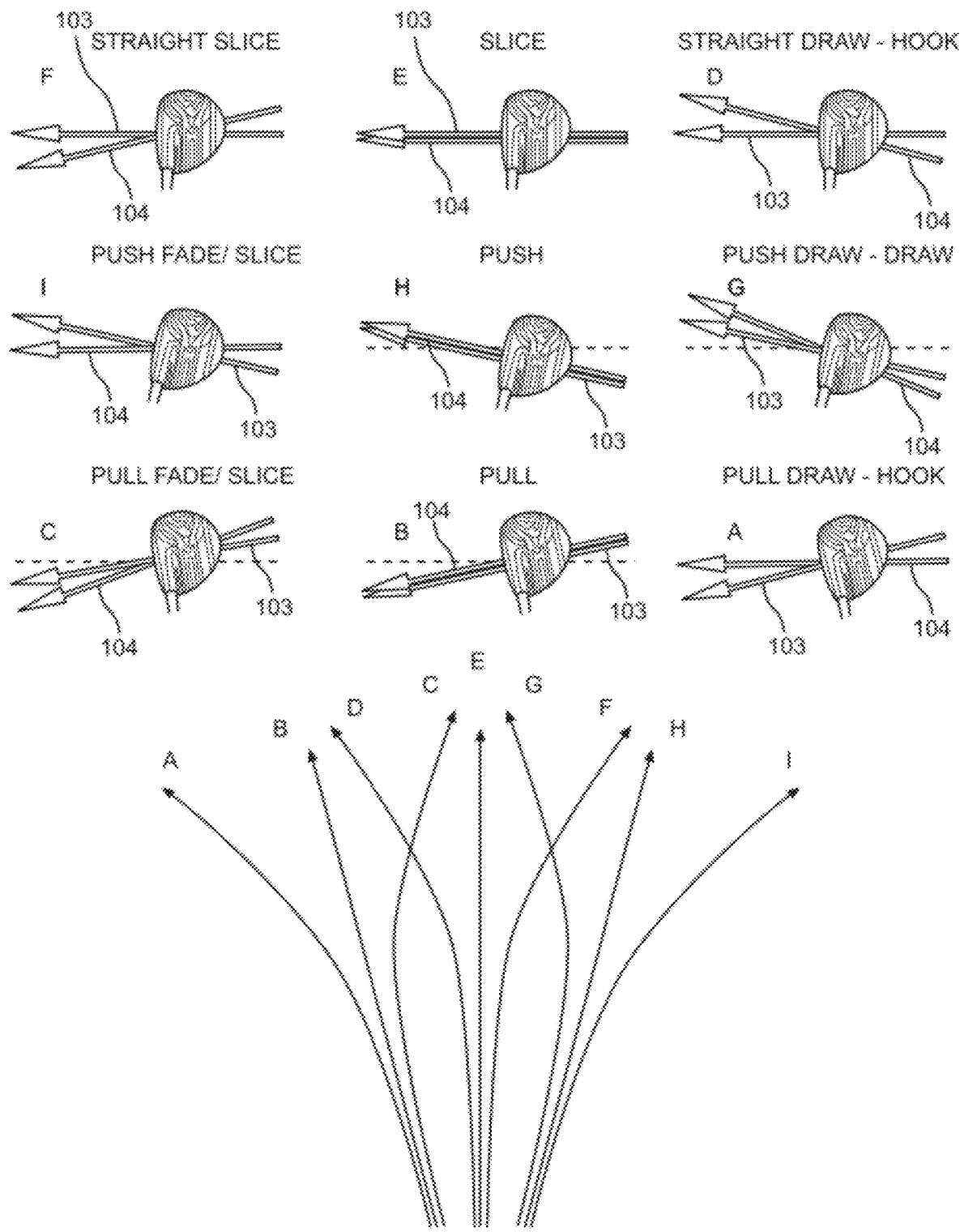
FIG. 8 is a schematic view showing the relationship between the club face angle and club swing path as well as the resultant ball flight pattern for a driver club.

Club Swing Path and Club Face Angle at Impact Analysis:

The smart golf eyewear 10 can be used to make recommendation regarding a club swing path and club face angle at impact based on the chosen golf club and the target part of the golf course. FIG. 8 is a schematic view showing the relationship between the club face angle 103 and club swing path 104 as well as the resultant ball flight pattern for a driver club. Once the user have decided on the ball flight pattern, the processor 110 will determine the club face angle with respect to the golf ball and club path in order to create the desired ball flight pattern once the club face impacts the golf ball. The processor 110 can then create silhouette on the displays 110 to present the recommended club face angle and club path on the displays 110 for the user to follow. If the club deviates from the recommended club path, the path silhouette on the displays 110 will turn red or notify the user that he/she is not swinging close to the proper recommended swing path. Similarly, if the club face deviates from the recommended club face angle, the club face silhouette will turn red or notify the user that the club face is not properly oriented to achieve the recommended club face angle.

Ball Lie and Rough Analysis:

The smart golf eyewear 10 of the first embodiment can capture images of a golf ball lie on a rough or hazards (such as lakes and bunkers). "Rough" refers to areas on a golf course outside of the fairways that generally feature higher, thicker grass or naturally growing (unkept and unmowed) vegetation. The term "lie" refers to the position of the ball on the ground or turf in relation to the player's stance and swing. A ball's lie can be affected by factors such as the slope of the terrain, the type of grass or surface it's sitting on, and the thickness of surrounding vegetation. There are many times when a golfer approaches their shot and doesn't realize that how much of the ball is visible (in the rough or sitting down in the grass) determines what club to use and what the most suitable swing stance to adopt. The smart golf eyewear 10 can suggest the stance to take, and the swing path, and the club to use based on how much of the ball is visible in the rough and the ball lie.

When choosing golf clubs based on ball lie, the smart golf eyewear 10 will consider the lie angle, which is the angle between the shaft and the sole of the club. The lie angle can affect how the clubhead meets the ball, which can impact the shot's trajectory, direction, and height. For example, when the ball is in the rough and is about 20% visible the club will be hitting mostly grass before you hit the ball, so for a stock distance for the chosen club (e.g. 150 yards) the user need to club up to a "stronger club" and put it more in the back of the stance in relation to the user's back foot, which will cause the club to hit the ball on the downswing thus getting more of the ball on impact.

Figure 9:
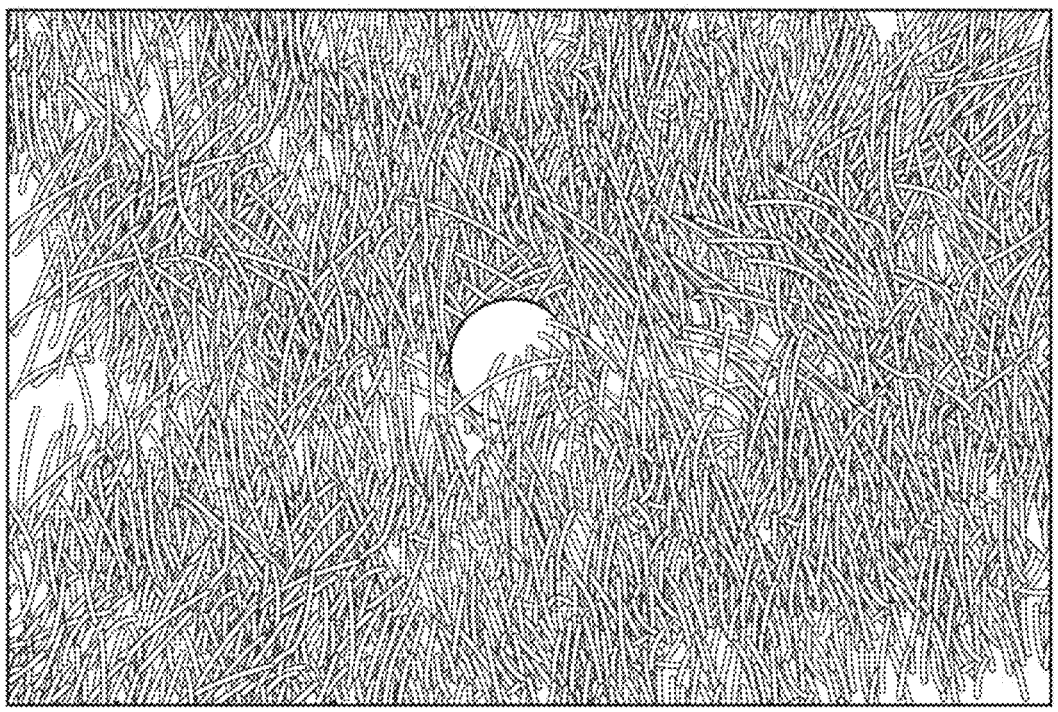
FIGS. 9-11 are perspective views of a golf ball in a rough seen through the displays of the smart golf eyewear.
Figure 10:
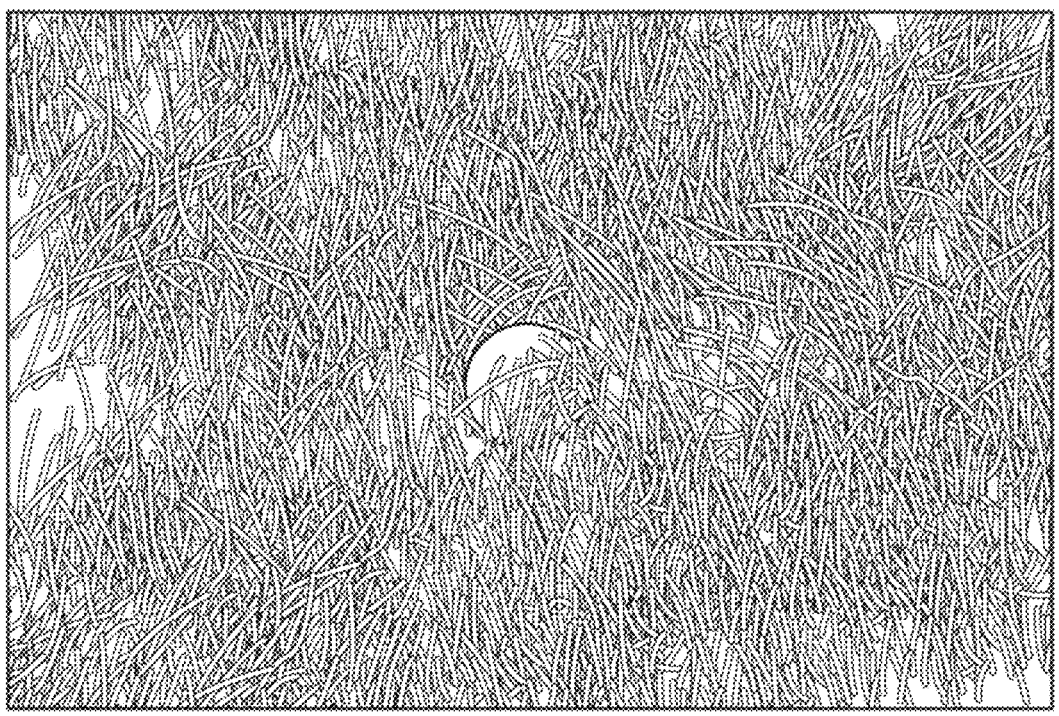
Figure 11:
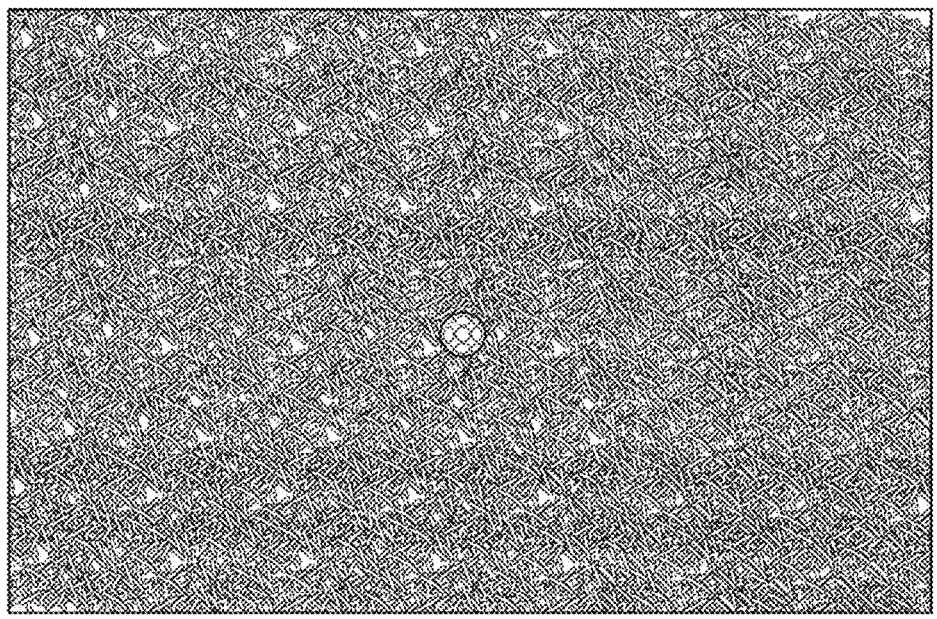

When the user arrives where the ball has landed after a shot, the first thing to do is to assess the distance you wish to cover. The smart golf eyewear 10 will determine the club to use based on the distance to cover. FIGS. 9-11 are perspective views of a golf ball in a rough seen through the displays 110 of smart golf eyewear 10. The camera module 160 will first capture images of the golf balls in the rough illustrated in FIGS. 9-11. The processor 110 can then use the images to determine whether the golf ball is in a rough and how visible is the golf ball in the rough (ball lie) in order to determine which club to recommend to the user. For instance, the processor 110 will processor the image of FIG. 9 and determine that the golf ball is in a rough and having a buried ball lie. The processor 110 can then recommend the use of a shorter club like a 9-Iron or a Wedge to dig through the grass more easily.

The processor 110 will processor the image of FIG. 10 and determine that the golf ball is also in a rough and having an in-between ball lie. The processor 110 will processor the image of FIG. 11 and determine that the golf ball is also in a rough and having a fluffy ball lie. The processor 110 can then present the analysis result on the displays 100 to show the user the golf ball's particular lie in the rough. The ball lies in FIG. 10-11 are much cleaner than that in FIG. 9. Thus, the processor 110 may recommend club specifically for the user to give the green a go if he/she is 150+ yard out. In other embodiments, the processor 110 may retrieve information related to the golf course grasses either directly from the data storage 120 or indirectly from a remote server to assess the type of grass in the image, the direction the grass is growing etc. before making club, stance, and swing path recommendations.

Figure 12:
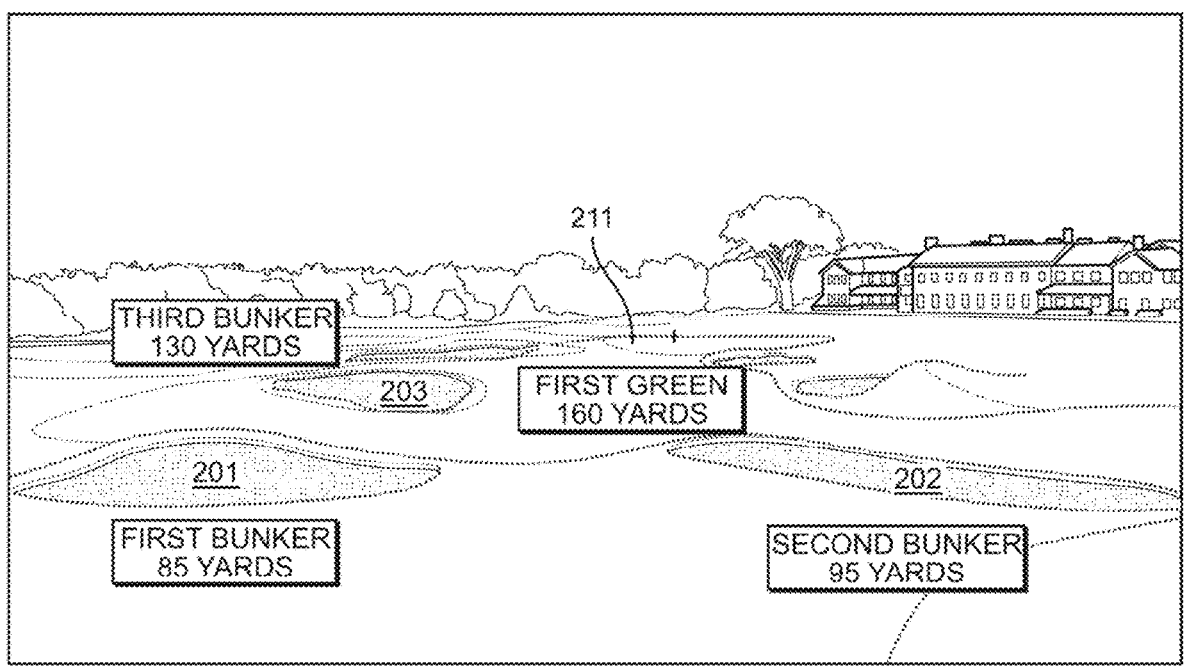
FIG. 12 is another perspective view of the golf course seen through the displays of the smart golf eyewear according to the first embodiment.

Next, smart golf eyewear 10 needs to assess the position of obstacles as well as the distance to and elevation of the green. Whether it's sand traps, ponds, trees, or simply the angle of the pitch, the ultimate goal is to avoid the obstacles or, at the very least, minimize the impact of the obstacles if it can't be avoided. FIG. 12 is another perspective view of the golf course seen through the displays 100 according to the first embodiment. Firstly, the processor 110 processes the image to determine the various parts of the golf course in the image such as a first bunkers 201, a second bunker 202, a third bunker 203, and a first green 211. The processor 110 can also determine other parts of the golf course such as water hazard and rough if they appear in the image capture by the camera module 160.

Once the processor 110 determines the important parts of golf course captured in the image in FIG. 12, it can use the GPS information associated with the user and the golf course to calculate the distance between the user and said important parts of golf course. For example, the GPS information regarding the area and location of the first bunker 201 may be stored locally in the data storage 120 or in a remote server. On the other hand, the GPS location of the user is preferably located in a remote server. The processor 110 can retrieve GPS information of both the first bunker 201 and the user using either the data storage 120 or the wireless module 130. The processor 110 can then use said GPS information to distance between the user between the center, front edge, and back edge of the first bunker 201. As illustrated in FIG. 12, the processor 110 can then send the distance information to the displays 100 to show the user in real time the distance between the user and the various parts of the first bunker 201. The processor 110 can also store the above-mentioned distance information in the data storage 120 for future reference.

The processor 110 can also use image processing to determine the elevation of the obstacles and greens in the capture image. For instance, the processor 110 can use image processing technique to determine the elevation of the first bunker 201 based on image gradient associated with the first bunker 201 in FIG. 12.

Thirdly, the smart golf eyewear 10 can make club recommendation for the user's consideration. In addition to the data stored in the data storage 120 (such as physical information of the user and past performance), the processor 110 can also use the newly obtained data on ball lie, rough type (buried, in-between, fluffy, etc.), obstacle distance, obstacle elevation, green distance, and green elevation to determine the most suitable club. For example, the ball is 160 yards from the green, but the user may need to overcome the third bunker 203 crossing at 130 yards. Using a 7-iron might land the ball directly in the third bunker 203, but an 8 or 9-iron may help take the golf ball right between the two second bunkers 202 203, making the approach to the first green 211 easier.

Finally, once the user has chosen a golf club, the smart golf eyewear 10 can create a stance and swing path for the user's consideration based on the club chosen and the ball lie in the rough. The Stance Tracking and Correction and Club Swing Path are already described above and thus will not be repeated here.

Figure 13:
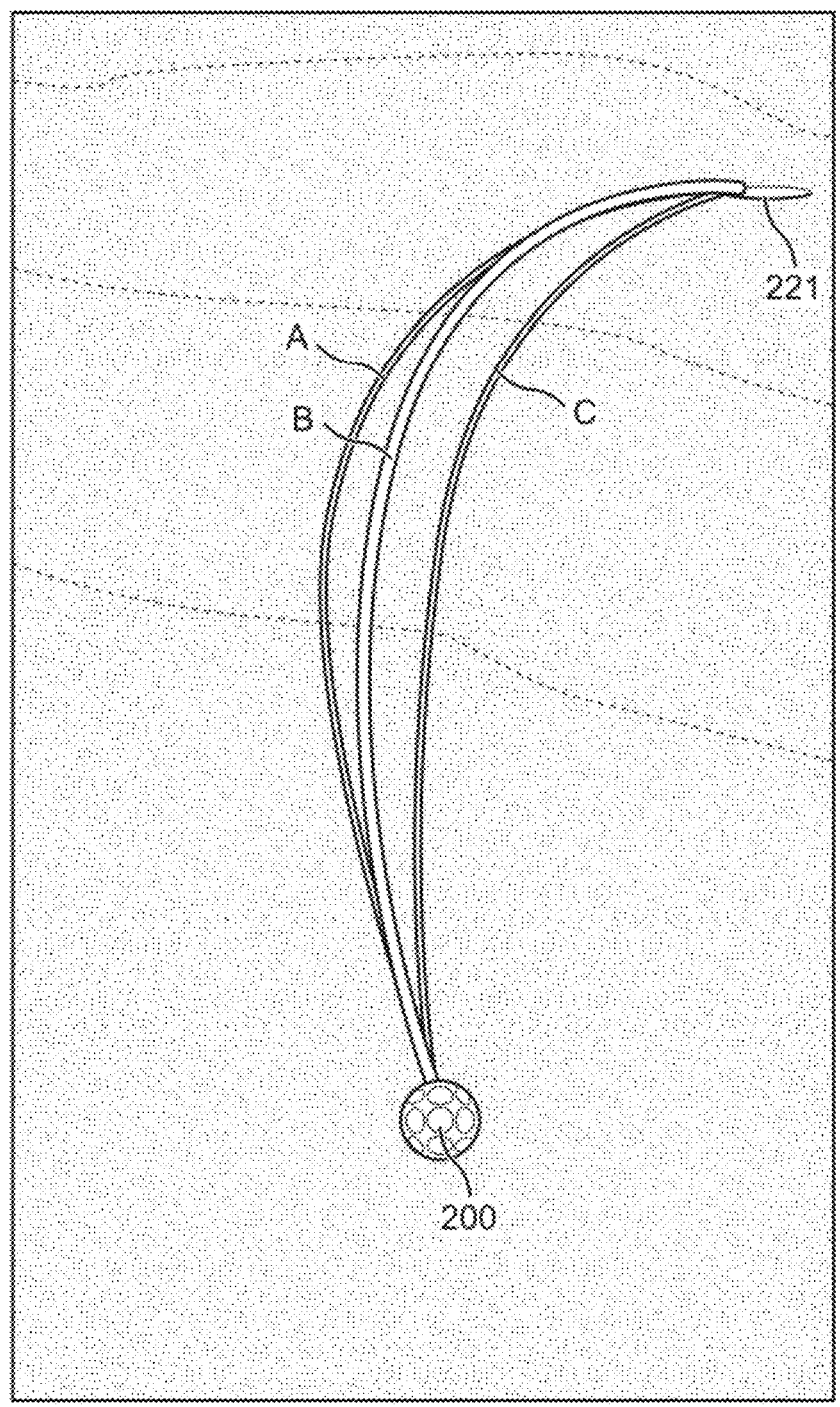
FIG. 13 is a perspective view illustrating a golf ball on a green and captured by the camera module according to the first embodiment.

Putting Assistance:

The same functionality described above can also be used to help the user with making putter shots. FIG. 13 is a perspective view illustrating a golf ball 200 on a green and captured by the camera module 160 according to the first embodiment. The processor 110 then processes the image illustrated in FIG. 13 in order to determine one or more line for the golf ball 200 to travel toward the hole 221. In the present embodiment, the processor 110 arrives at three lines A, B, C and present these lines A, B, C on the displays 100 for the user's consideration. The user can then use the microphone to voice his/her choice of the line for the golf ball to travel toward the hole.

Figure 14:
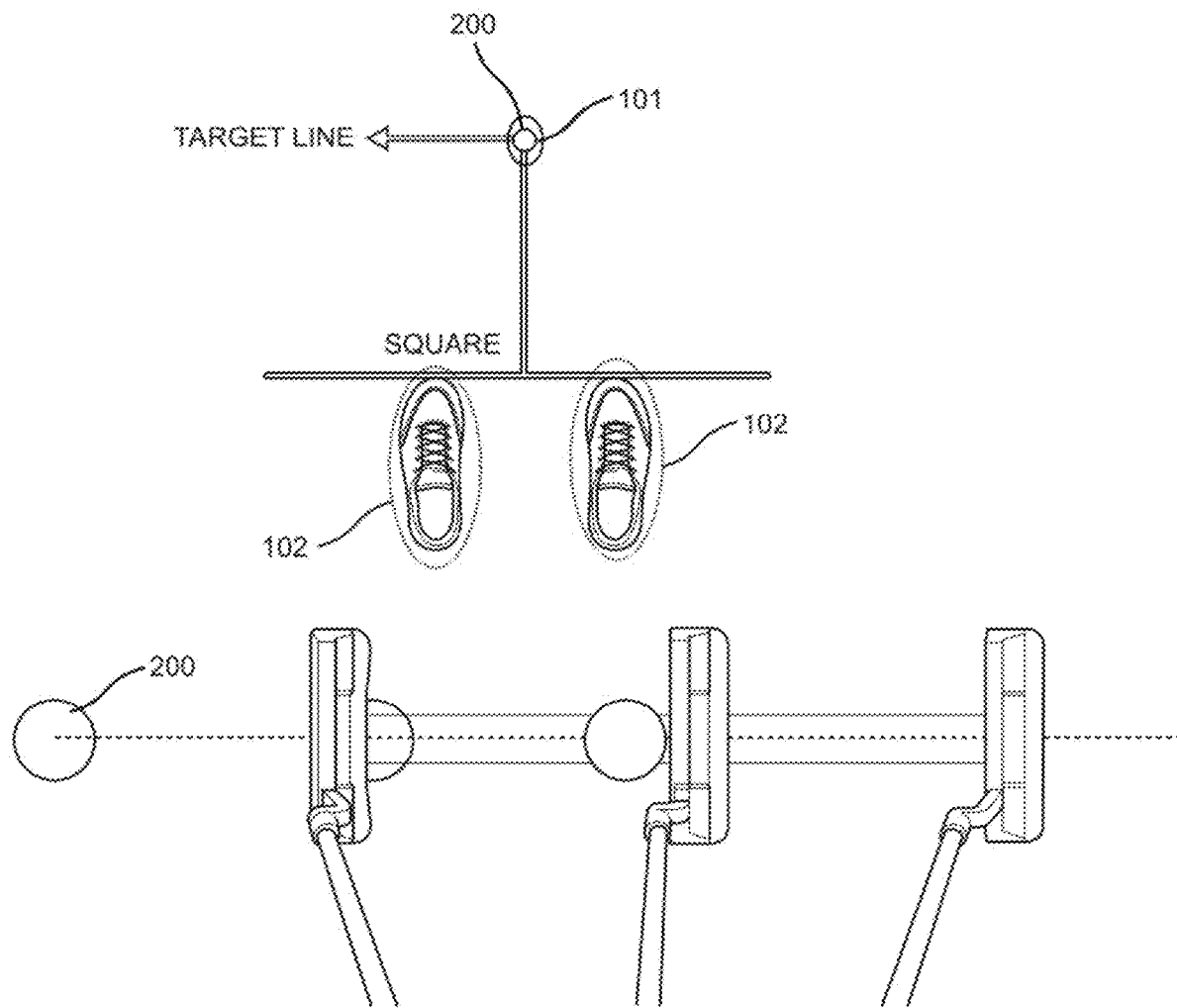
FIG. 14 is a schematic view of the recommended feet position relative to the golf ball and the recommended swing path for the user to make a putter shot.

Next, the smart golf eyewear 10 needs to get the user into a stance best suited to make a putter shot. FIG. 14 is a schematic view of recommended feet position relative to the golf ball 200 and the recommended swing path for the user to make a putter shot. As illustrated in FIG. 14, the processor 11 present a ball silhouette 101 on the displays 110 for the user to align with the golf ball 200 and two foot silhouette for the user to align with his/her shoes. FIG. 14 also shows the recommended in-line path for the user to take the putter shot. However, the processor 110 may also recommend other club paths (such as arched club path and combination club path) depending on the slope of the green, the type of grass on the green, and the direction the grass is growing etc.

TeleCaddie Mode:

The smart golf eyewear 10 also allows the user to connect with an instructor live while the user is wearing the smart golf eyewear 10. The instructor can see the user swing from the user's point of view using the camera module 160 that constantly captures images of the user's point of view (POV). The instructor can display a swing fix directly on the displays 110 to give the user the solution to the problem as well as ask the user to place your mobile phone in a Caddie Vision. "Mount" and the coach can also see your swing from the outside as well as the POV (Point of view). For example, if the user is having an issue with the chipping, the instructor can view the user's swing from the user's POV and send a suggested swing path to the displays 110 and coach the user to swing in that swing path and hinge their wrists in the displayed position in the users swing. The TeleCaddie mode allows the user to have access to instructors across the nation who is available and fill space in their schedule for on-the-spot instruction. The user can initiate a discussion with the coach in real time using the microphone 140 and speaker 150 to send to and receive voice signal from the coach's electronic device.

Figure 15:
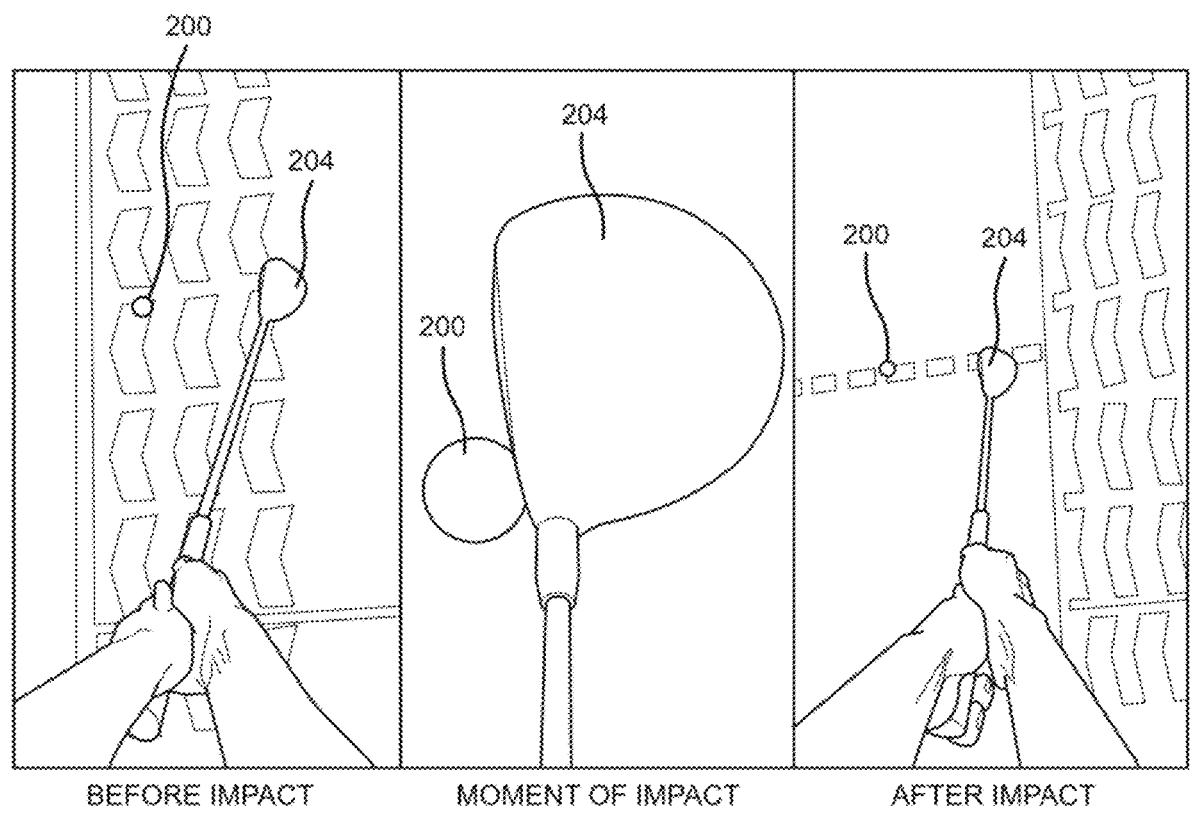
FIG. 15 is a perspective view showing images a swing path of a golf club before hitting the golf ball, hitting the golf ball, and after hitting the golf ball.

Shot Capture and Lost Ball Mode:

The smart golf eyewear 10 can help the user find the golf by extrapolating where the ball may be and guide the user to the lost ball. Firstly, smart golf eyewear 10 can accomplish that based on how the club impacts the golf ball. As the user is looking at the golf ball and hitting the golf ball with the chosen, the camera module 160 captures and records images of the moments the club impacts the golf ball. FIG. 15 is a perspective view showing images a swing path of a golf club before hitting the golf ball 200, hitting the golf ball 200, and after hitting the golf ball 200. In this scenario, the camera module 160 will capture images moments between before and after the club face hits the golf ball. The processor 110 can then process the images to extract various information related to the shot such as where on the club face the ball is struck, swing speed, ball speed, ball spin rate, and face angle of golf club, etc. The processor 110 can then present the information above on the displays 110 to provide the user with instant feedback on the shot he/she just made.

Figure 16:
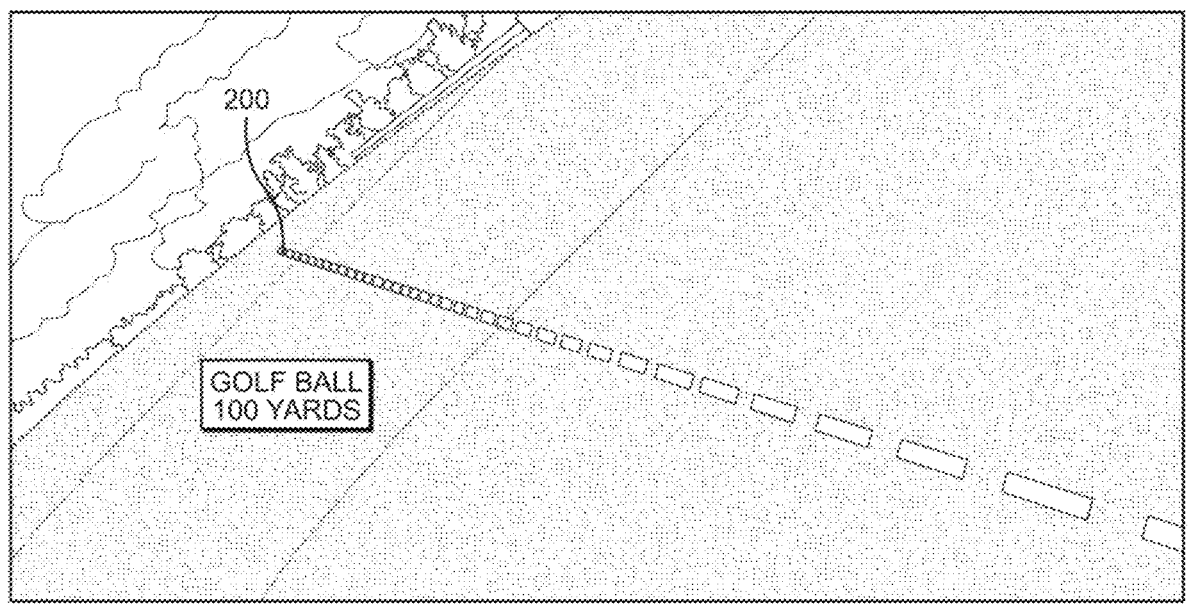
FIG. 16 is a perspective view showing a golf ball hit by the user with the chosen golf club and travelling in midair.

FIG. 16 is a perspective view showing a golf ball 200 hit by the user with the chosen golf club and travelling in midair. The user can keep looking at the golf ball 200 in midair and use the camera module 160 to capture images of the golf ball 200 in flight. The processor 110 can then process the images of the golf ball 200 in midair to determine how far the golf ball will likely travel. In one embodiment, the processor 110 can also include information such as wind speed, and wind direction in the calculation of the travelling distance of the golf ball 200. The processor 110 can then use the calculated travelling distance to estimate the landing position of the golf ball 200 and its GPS location using the GPS data either stored locally in the data storage 120 or in a remote server. The processor 110 can then estimate the distance between the user and the golf ball by using the GPS location of the user and that of the golf ball. The processor 110 can then present the above-mentioned distance information on the displays 110 for the user's reference.

In another embodiment, the golf ball 200 may be fitted with a GPS tracker that uses the Global Positioning System (GPS) to determine and transmit the location of the golf ball in real-time. The GPS tracker of the golf ball 200 may be wirelessly connected to the wireless module 130 or a remote server. In either case, the processor 110 can determine the location of the golf ball 200 simply by using the wireless module 130 to retrieve the GPS location of the golf ball 200 either directly from GPS tracker or from a remote server.

Figure 17:
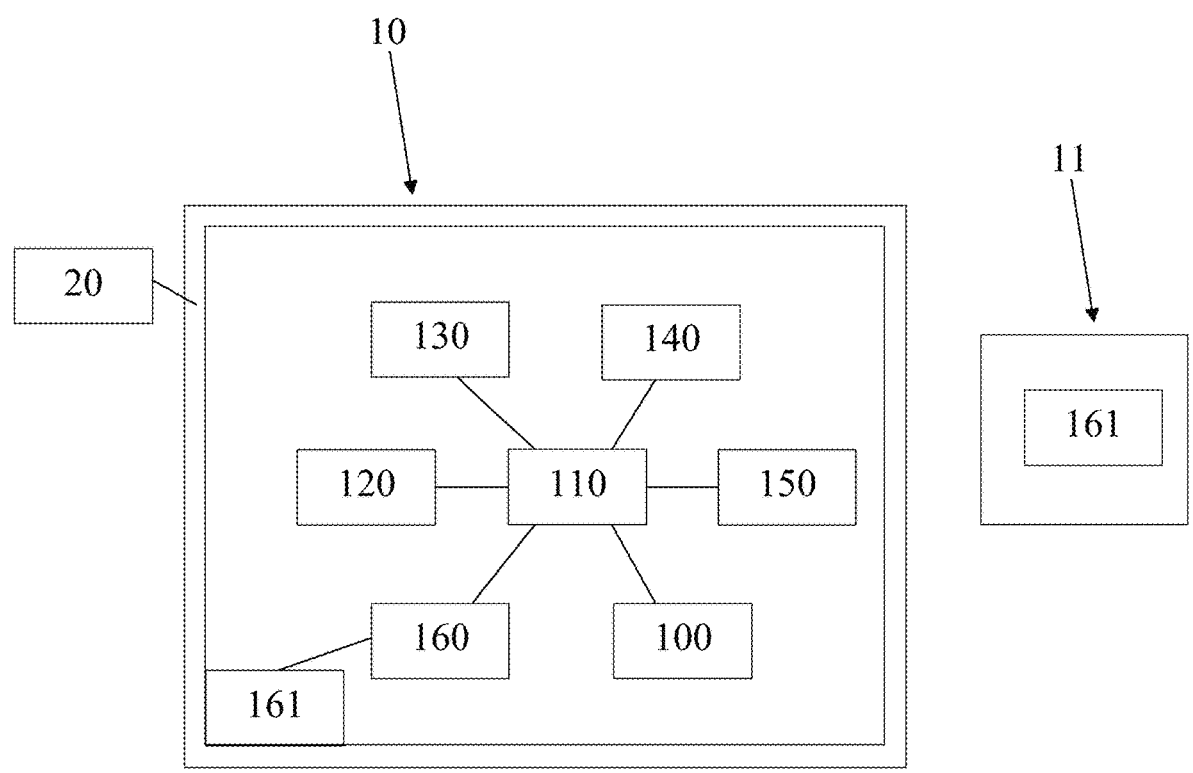
FIG. 17 is a block diagram of the smart golf eyewear according to a second embodiment of the present disclosure.
Figure 18:
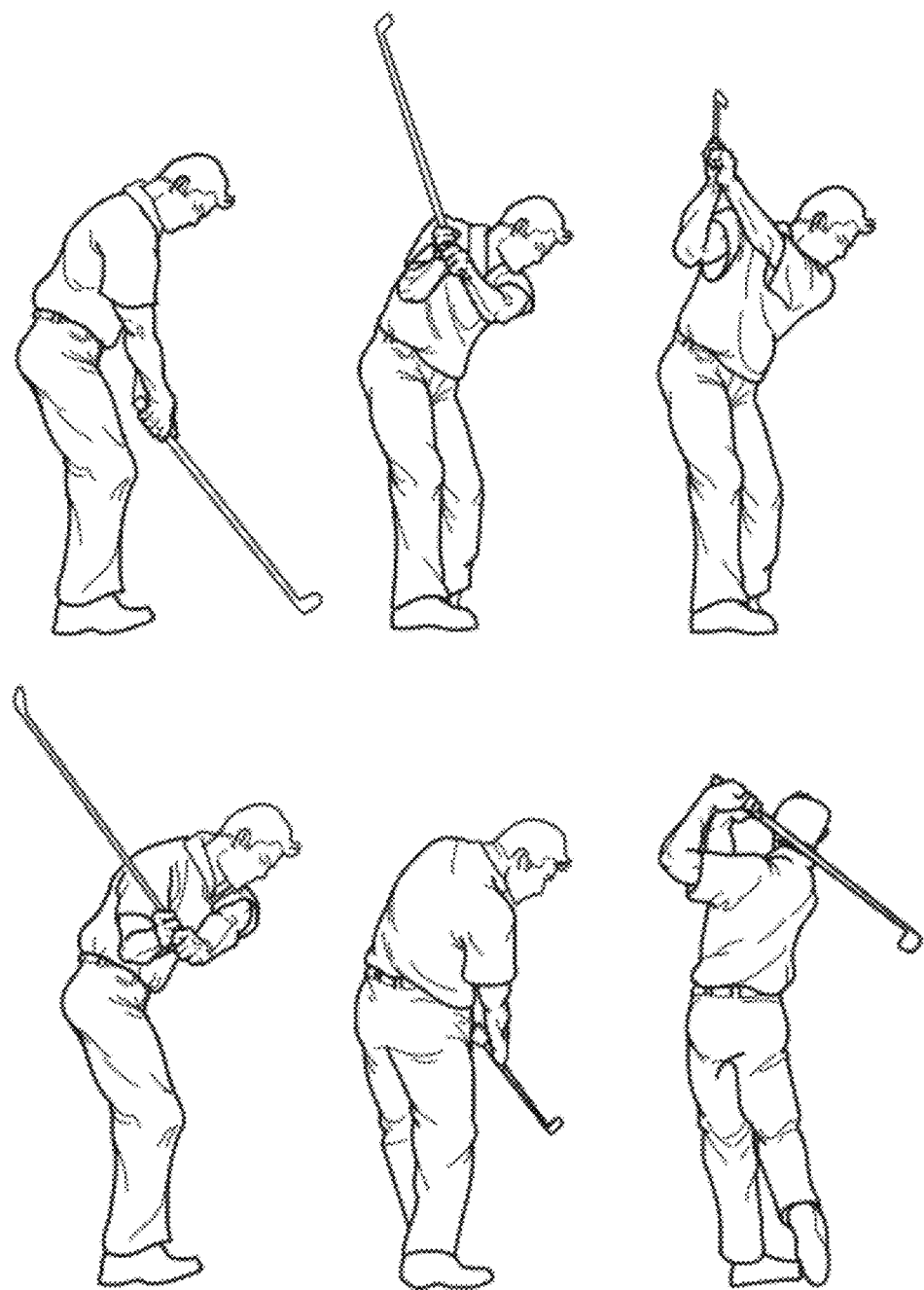
FIG. 18 is a perspective view of the images taken by the external camera module near the user making a golf swing according to the second embodiment.

Additional Camera Module:

In addition to the camera module 160 installed in the smart golf eyewear 10, the smart golf eyewear 10 can also use external camera modules to captures images of the user making a club swing or the golf ball in flight from different angles and perspective. The processor 110 can then use the above-mentioned images to extract information not contained in the images captured by the internal camera module 160. FIG. 17 is a block diagram of the smart golf eyewear 10 according to a second embodiment of the present disclosure. In the second embodiment, a coach or friend near the user can use an external electronic device 11 having an external camera module 161 to capture images of the user making a golf swing from the side. For instance, a friend can use the proprietary application on his/her smart phone to capture and record images of the user making a golf swing. FIG. 18 is a perspective view of the images taken by the external camera module 161 near the user making a golf swing according to the second embodiment. The external electronic device 11 can send the images either directly to the wireless module 130 or indirectly to the wireless module 130 through the Internet. The processor 110 can then use the images (taken by the external camera module 161) to determine information such as wrist angle at impact, club swing speed, ball speed, backspin rate, sidespin rate, launch angle, etc.

Because the user of the smart golf eyewear 10 does not look at his arms and wrists during a back swing, the external camera module 161 can help captures images the user's arms and wrists in the backswing for the processor 110 to analyze. Further, in the second embodiment, the external camera module 161 is installed on a smart phone 11. In other embodiments, the external camera module 161 can be installed on a golf cart or a pole on the golf course.

Figure 19:
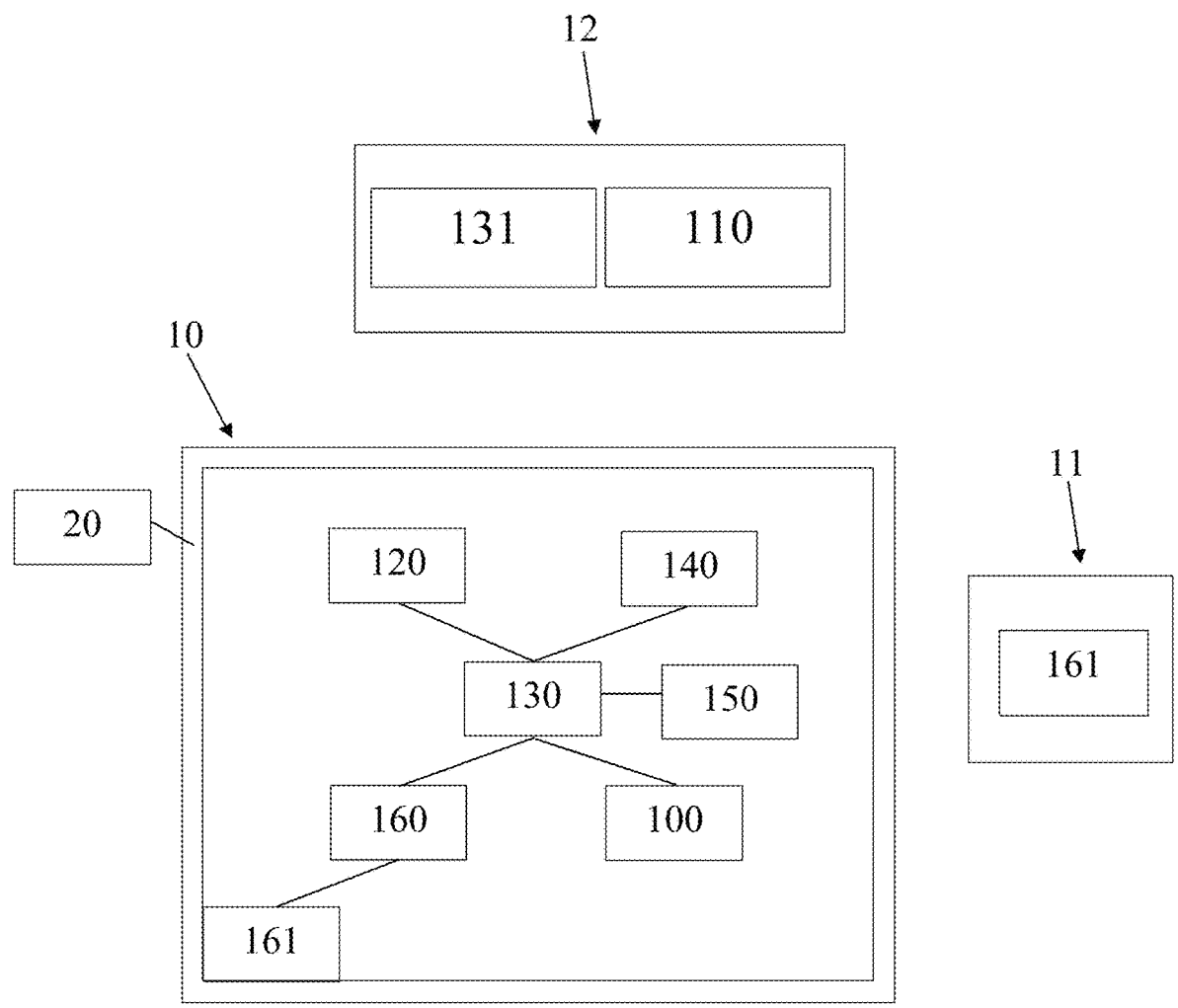
FIG. 19 is a block diagram of the smart golf eyewear according to a third embodiment of the present disclosure.

Cloud Computing:

In the first and second embodiments, the processor 110 configured to process the images are disposed in the smart golf eyewear 10 wore by the user. However, in different embodiments, the processor 110 can be placed in a remote location from the user. The images may be wirelessly sent from the smart golf eyewear 10 to the processor 110 to be processed. FIG. 19 is a block diagram of the smart golf eyewear 10 according to a third embodiment of the present disclosure. In the present embodiment, the processor 110 is located in a remote server 12 having an external wireless module 131 wireless connected to the wireless module 130 on the smart golf eyewear 10 and the smart phone 11. Images captured by the camera module 160 can be sent to the processor 110 using the two wireless modules 130, 131. Similarly, images captured by the external camera module 161 can be sent to the processor 110 using the external wireless module 131 and the smart phone 11. The processor 110 can then process the images to perform the functions discussed above, such as Range Finder Mode, Golf Course Bird View Display, Stance Tracking and Correction, Club Swing Path Analysis, Club face Angle at Impact Analysis, Ball Lie and Rough Analysis, and Lost Ball Mode, etc. The processor 110 can then send the information, such as recommended swing path and feet position relative to the golf ball, to the wireless module 130 to be presented on the displays 100 of the smart golf eyewear 10.

For example, the processor 110 can perform the range finder function by processing the images (e.g. in FIGS. 3 and 12) and determine the objects in the images. Once the processor 110 determines the important parts of golf course captured in the image, it can use the GPS information associated with the user and various parts of the golf course to calculate the distance between the user and said important parts of golf course. For example, the GPS information of the first bunker 201 may be stored locally in the data storage 120 or in a remote server. On the other hand, the GPS location of the user is preferably located in a remote server. The processor 110 can retrieve GPS information of both the first bunker 201 and the user either from the data storage 120 or using the external wireless module 131. The processor 110 can use said GPS information to calculate the distance between the user and the first bunker 201. The processor 110 can then send the distance information to the wireless module 130 to be presented on the displays 100.

In another example, the processor 110 can process the images received to extract various information related to the shot such as where on the club face the ball is struck, swing speed, ball speed, ball spin rate, sidespin rate, face angle of golf club, wrist angle at impact, launch angle etc. The processor 110 can then send the extracted information to the wireless module 130 to be presented on the displays 110 the smart golf eyewear 10 for the user's reference.

Historic Performance Analysis:

The smart golf eyewear 10 of the present disclosure can also store historical performance data on various areas of the sport. For instance, the smart golf eyewear 10 can break down the sport into four categories, i.e. Drive, Approach, Chip, and Putt and record the user's performance in each category. For the Drive category, the smart golf eyewear 10 can record distance of all the past driver shot and the club type (shaft flex variation, shaft length, face type, etc.) associated with the particular shot. The smart golf eyewear 10 can also show the minimum, maximum, and average distances of the driver shot as well as the club type associated with the minimum and maximum distance achieved. For the Approach category, the smart golf eyewear 10 record how often your approach shots miss the green to the left, right, short or long. The smart golf eyewear 10 can also save how well the user shoot from different distances approaching the green, starting from 50 yards out and the club type associated with each shot (e.g. 3-9 irons or wedges club).

For the Chip category, the smart golf eyewear 10 can save data on how accurate the user were at chipping onto the green from 50 yards. The smart golf eyewear 10 can also save stats on both chip shots that landed on and not landed on the green as well as the club type used (pitching wedge, sand wedge, iron, chipper, putter, etc.). For the Putt category, the smart golf eyewear 10 can save the percentage of 1-putts, 2-putts and 3-or-more-putts the user make from short (<10 feet), medium (10-20 feet) and long (>20 feet) distances from the hole. Furthermore, the above-mentioned data can be saved either locally in the data storage 120 or a remote server through the wireless module 130.

Hero Shot Mode:

Sometimes, the user may want to make a "hero shot" which refers to a remarkable, clutch shot that stands out during a round. It's the kind of shot that makes a big impact, often coming at a crucial moment in the game. This could be a long putt to win a match, a challenging approach shot that lands close to the pin, or a recovery shot from a tough lie. The smart golf eyewear 10 can use the historic performance data of the user help the user determine the chance of successfully making a hero shot.

For instance, if the user has decided to use a wood club to make a driving distance of 300 yards, the user can vocally inform the processor 110 of his/her plan using the microphone 140. The microphone 140 will then convert voice of the user into electrical signals to be sent to the processor 110. Based on the plan, the processor 110 can retrieve the historic performance data regarding the user and his/her performance with a wood club (such as the minimum, maximum, and average distances of the driver shot) either from the data storage 120 or a remote server. The processor 110 can also calculate the percentage chance of the user successfully making a 300 yards driver shot based on the historic performance data. The processor 110 can then present the above-mentioned data on the displays 100 to show the user the likelihood of a successful 300 yards driver shot and leave the user to decide whether to stick to the original plan or change strategy by choosing a different golf club or adjust the desired driver distance.

Figure 20:
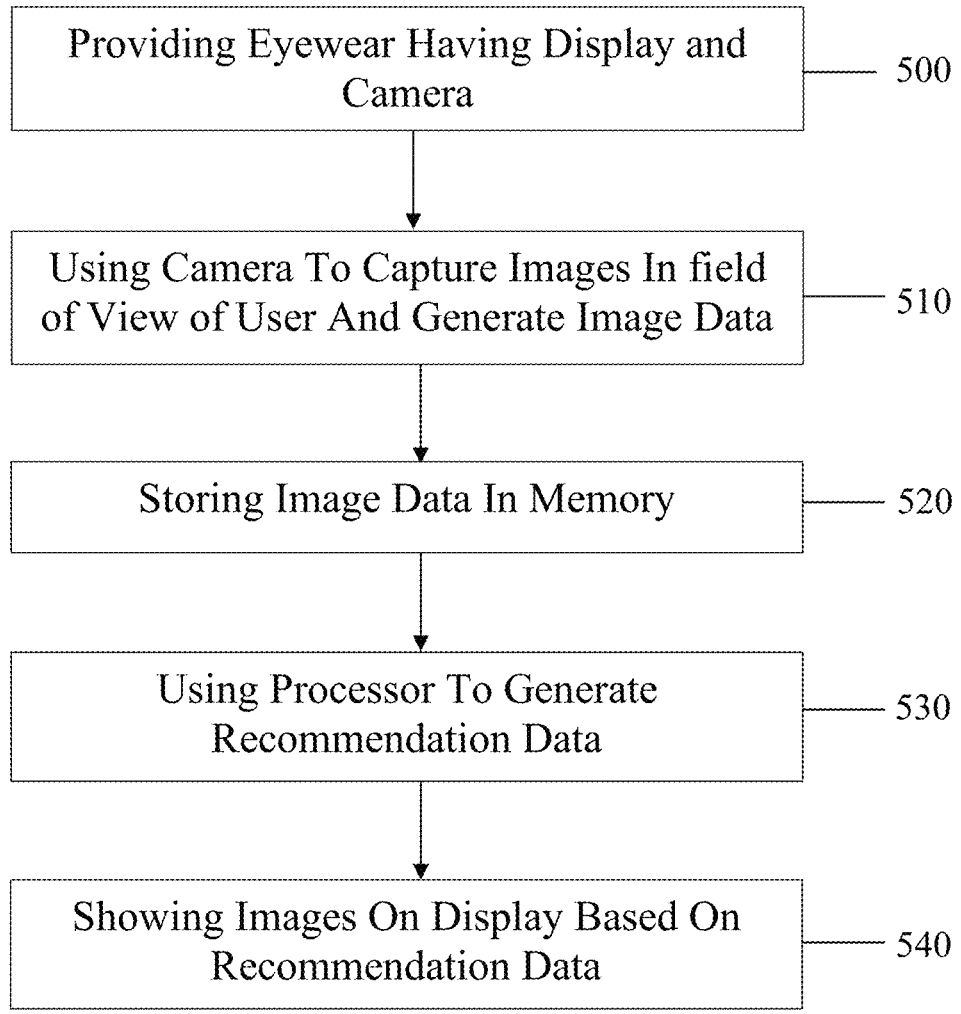
FIG. 20 is a flow chart of a method of offering real-time assistance to a golf player according to a fourth embodiment of the present disclosure.

FIG. 20 is a flow chart of a method of offering real-time assistance to a golf player according to a fourth embodiment of the present disclosure. The method includes step 500 of providing an eyewear to be worn by the player, wherein the eyewear includes a display and a camera. In the fourth embodiment, the display includes transparent LCDs using a similar principle to traditional LCDs and modified with polarizers and other components to allow light to pass through. The liquid crystals of the display are manipulated to either block or allow light through when the display is active. In different embodiments, the display can also include light-emitting diode (LED) screens, organic light-emitting diode screens, electroluminescent displays, and other see-through displays or transparent display that allows the user to see what is shown on the display while still being able to see through it. The camera further includes a camera lens attached to the body of the eyewear. The camera lens are preferably positioned so that it will be located above the user's right eye when a user wears the smart golf eyewear such as the smart golf eyewear 10 illustrated in FIG. 1.

The method further includes step 510 of using the camera to capture images of a field of view of the user and generate image data based on the captured images. As discussed above, the camera lens is preferably located right above the user's eye when a user wears the smart golf eyewear in order to capture images of a field of view of the user. The captured images include a schematic view of the a golf course (illustrated in FIGS. 3 and 12), golf stance of the user relative to a golf ball (illustrated in FIGS. 5-7), a golf ball in a rough (illustrated in FIGS. 9-11), a golf ball on a green (illustrated in FIG. 13), a golf ball being hit by a golf club (illustrated in FIGS. 14-15), a golf ball hit by the user with the chosen golf club and travelling in midair (illustrated in FIG. 16).

The method further includes step 520 of storing the image data in a memory. In one embodiment, the eyewear includes inside its body a memory electrically connected to the camera to receive and store the digital image data. In another embodiment, the memory can be a remote data storage device signally connected to a wireless module of the eyewear. The above-mentioned wireless module can receive image data from the camera and wirelessly send the image data to the remote memory to be stored.

The method further includes step 530 of using a processor to generate recommendation data based at least on the image data, wherein the recommendation data includes a recommended swing path. In one embodiment, the eyewear includes inside its body a process electrically connected to a memory to receive and process the image data generated by the camera. The processor can generate information, such as recommended swing path and feet position relative to the golf ball, based on the image data. In another embodiment, the processor can be a remote data processing unit signally connected to a wireless module of the eyewear. The above-mentioned wireless module can receive image data from the camera and wirelessly send the image data to the remote processing unit to be processed for generating information (such as recommended swing path and feet position relative to the golf ball).

The method further includes step 540 of showing images on the display based on the recommendation data, wherein the recommendation images include the recommended swing path.

As illustrated in FIG. 3, once the processor determines the important parts of golf course captured in the image, it can use the GPS information associated with the user and the golf course to calculate the distance between the user and said important parts of golf course. As illustrated in FIG. 3, the processor can then send the distance information to the displays to show the user in real time the distance between the user and the various parts of the first bunker. The processor can also store the above-mentioned distance information in the data storage for future reference. In another embodiment illustrated in FIG. 5, the processor can place silhouette on the displays to show the user the recommended locations of the user's feet relative to the golf ball.

In one embodiment, the method includes capturing images of a golf ball in flight. The step of capturing images of the golf ball in flight includes using the camera to capture trajectory images of a golf ball travelling in air, generate trajectory data based on the trajectory images, determining a trajectory of the golf ball travelling in the air based on the trajectory data, determining a club speed and a club angle distance based on the club swing data, and determining a distance travelled by the golf ball and estimate a landing location based on the trajectory, the club speed, and the club angle.

The method further includes capturing takeaway images of the golf club moves away from the golf ball. In one embodiment, the method makes use of external camera modules to captures images of the user making a club swing. A coach or friend near the user can use an external electronic device having an external camera module to capture images of the user making a golf swing from the side. For instance, a friend can use the proprietary application on his/her smart phone to capture and record images of the user making a golf swing. The external electronic device can send the images to the eyewear. The processor can then use the images to determine information such as wrist angle at impact, club swing speed, ball speed, backspin rate, sidespin rate, launch angle, etc.

The method also includes determining that the golf ball is in a rough and then making club recommendation for the user to dig through the grass more easily. The method includes first capturing images of a golf ball in a rough and having a ball lie. The method then uses the processor to present the analysis result on the displays to show the user the golf ball's particular lie in the rough. Lastly, the processor may recommend club specifically for the user to give the green a go if he/she is 150+ yard out. In other embodiments, the processor may retrieve information related to the golf course grasses either directly from the memory or indirectly from a remote server to assess the type of grass in the image, the direction the grass is growing etc. before making club, stance, and swing path recommendations.

The method also includes a range finder mode that determines the distance between the user and a gazed location where the playing is looking at. Firstly, the camera captures and records images similar to the user's real world view through the displays. The processor then processes the images to determine the objects in the images. Secondly, the processor processes the image to determine the objects and the various parts of the golf course in the image such as the golf ball, bunkers, greens, and holes. The processor can also determine other parts of the golf course such as water hazard and rough if they appear in the image capture by the camera. Once the processor determines the important parts of golf course captured in the image, it can use the GPS information associated with the user and the golf course to calculate the distance between the user and said important parts of golf course.

The method further includes making golf club recommendation. In addition to the data stored in the memory (such as physical information of the user and past performance), the processor can also use the newly obtained data on ball lie, rough type (buried, in-between, fluffy, etc.), obstacle distance, obstacle elevation, green distance, and green elevation to determine the most suitable club. The step of making golf club recommendation includes first storing golf course information and range data on a plurality of golf clubs in the memory; wirelessly receiving position data on a current position of the user; determining a distance between the current position of the player and a golf hole; choosing one of the golf clubs based on the range data in the memory; and using the display to recommend the chosen golf club.

The method also includes offering putting assistance to the user. The method includes capturing images of a golf ball on a putting green and generate image data thereof. The method further includes determining contours of the putting green based on the putting image data; determine a putting line based on the putting image data and the determined contours; and including the putting line in the generation of the recommendation data. The recommendation data includes at least one of a club recommendation and the recommended swing path, and player feet position. The putting assistance of the present disclosure can be illustrated in FIG. 13 that shows an image of the golf ball 200 on a green and captured by the camera. The processor then processes the image illustrated in FIG. 13 to determine one or more line for the golf ball to travel toward the hole. As illustrated in FIG. 13, the processor 110 arrives at three lines A, B, C and present these lines A, B, C on the displays for the user's consideration. The user can then use the microphone to voice his/her choice of the line for the golf ball to travel toward the hole.

The foregoing descriptions of specific implementations have been presented for purposes of illustration and description. They are not intended to be exhaustive or to limit the invention to the precise forms disclosed, and modifications and variations are possible in view of the above teaching. The exemplary implementations were chosen and described to best explain the principles of the invention and its practical application, to thereby enable others skilled in the art to best utilize the invention and its implementations with modifications as suited to the use contemplated.

It is therefore submitted that the invention has been shown and described in the most practical and exemplary implementations. It should be recognized that departures may be made which fall within the scope of the invention. With respect to the description provided herein, it is submitted that the optimal features of the invention include variations in size, materials, shape, form, function, manner of operation, assembly, and use. All structures, functions, and relationships equivalent or essentially equivalent to those disclosed are intended to be encompassed by the invention.

The invention claimed is:

1. An eyewear worn by a golf player, the eyewear comprising:
   a display;
   a camera for capturing images of a field of view of the player and generating image data based on the images, wherein the image includes a golf ball;
   a memory electrically connected to the camera to receive data; and
   a processor electrically connected to the memory and the display, the processor is programmed to:
      generate a hologram that is a first colored circle hologram on the display, and track stances and recommend stance in response to alignment of the golf ball with the hologram, such that the hologram turns to a second colored circle after alignment of the hologram with the golf ball is complete;
      generate a silhouette of feet as a captured moving image of the feet of the player on the display based on the stance and a club, such that a position of the silhouette on the display changes in response to changing the club while a position of the display remains unchanged;
      generate recommendation data based at least on the image data, wherein the recommendation data includes a recommended swing path; and
      show recommendation images on the display based on the recommendation data, wherein the recommendation images include the recommended swing path.

2. The eyewear of claim 1 further comprising:
   a speaker, wherein the processor is programmed to generate audio recommendations using the speaker based on the recommendation data; and
   a microphone configured to convert a user voice into user input signals.

3. The eyewear of claim 1, further including a wireless device for receiving real-time information, wherein the memory includes golf course information, the processor is programmed to:
   show the golf course information on the display;
   change the golf information based on the real-time information;
   adjust the recommendation data based on the changed golf information; and
   recommend the stance based on club used and intended shot of the golf ball in response to the golf ball being in an optimal position for a shot based on position of the golf ball, movement of the golf ball, and stance of the player.

4. The eyewear of claim 1, the camera records trajectory images of a golf ball travelling in air to generate trajectory data based on the trajectory images, the processor is programmed to:
   determine a trajectory of the golf ball travelling in the air based on the trajectory data;
   determine a club speed and a club angle distance based on the club swing data; and
   determine a distance travelled by the golf ball and estimate a landing location based on the trajectory, the club speed, and the club angle.

5. The eyewear of claim 1, wherein the memory includes data of past club swings that include club takeaway angles, club descent angles, and club impact angle, the processor is programmed to use instance-based learning to generate the recommendation data using the historical data.

6. The eyewear of claim 1, wherein the camera captures takeaway images of the golf club moving away from the golf ball to generate takeaway data, the processor is programmed to:
   using the takeaway data to determine whether a club angle of the golf club is open or close in relation to the recommended swing path; and
   generate a takeaway notification on the display regarding whether the golf club is open or close in relation to the recommended swing path.

7. The eyewear of claim 1, wherein the camera captures stroke images of the golf club moving toward and hitting the golf ball to generate impact data, the processor is programmed to:
   determine an angle of descent of the golf club using the captured stroke images of the golf club moving toward the golf ball; and
   determine an angle of impact of the golf club using the captured stroke images of the golf club hitting the golf ball.

8. The eyewear of claim 1, wherein the camera captures ball images of the golf ball on a golf course and images of the golf course surrounding the golf ball to then generate rough data, the processor is programmed to:
   determine a course feature of the golf course based on the rough data;
   determine a depth of the golf ball on the course feature based on the rough data; and
   include the course feature and depth of the golf ball in the generation of the recommendation data, wherein the recommendation data includes at least one of a club recommendation and the recommended swing path, and player feet position.

9. The eyewear of claim 1, further comprising:
   a wireless device for:
     receiving instructor data from an instructor device, wherein the instructor device can selectively receive image data from an external camera; and
   a speaker electrically connected to the processor, wherein the processor is programmed to:
     generate images on the display based on the instructor data; and
     selectively generate audio signal using the speaker based on the instructor data.

10. The eyewear of claim 1, further comprising a wireless device for communicating with a radio navigation system to receive position data, wherein the processor is programmed to:
   use the captured image of the field of view to determine a gazed location the player is looking at;
   use the wireless device and the radio navigation system to determine a position of the gazed location;
   use the wireless device and the radio navigation system to determine a current position of the user; and
   determine a distance between the user and the gazed location.

11. The eyewear of claim 1, further comprising a wireless device for receiving position data on a current position of the user, the memory includes golf course information and range data on a plurality of golf s having different shot ranges, wherein the processor is programmed to:
   determine a distance between the current position of the player and a golf hole;
   choose one of the golf clubs based on the range data in the memory; and
   using the display to recommend the chosen golf club.

12. The eyewear of claim 1, wherein the camera captures images of the golf ball on a putting green and images of the putting green surrounding the golf ball to then generate putting data, the processor is programmed to:
   determine contours of the putting green based on the putting data;
   determine a putting line based on the putting data and the determined contours; and
   include the putting line in the generation of the recommendation data, wherein the recommendation data includes at least one of a club recommendation and the recommended swing path, and player feet position.

13. A method of offering real-time assistance to a golf player, comprising:
   providing an eyewear to be worn by the player, wherein the eyewear includes a display and a camera;
   using the camera to capture images of a field of view of the player and generate image data based on the captured images;
   storing the image data in a memory;
   using a processor to generate recommendation data based at least on the image data, wherein the recommendation data includes a recommended swing path;
   generating a hologram that is a first colored circle hologram on the display, and tracking stances and recommending stance in response to alignment of the golf ball with the hologram, such that the hologram turns to a second colored circle after alignment of the hologram with the golf ball is complete;
   generating a silhouette of feet as a captured moving image of the feet of the player on the display based on the stance and a club, such that a position of the silhouette on the display changes in response to changing the club while a position of the display remains unchanged; and
   showing recommendation images on the display based on the recommendation data, wherein the recommendation images include the recommended swing path.

14. The method of claim 13, further comprising:
   using the camera to capture trajectory images of a golf ball travelling in air and then generate trajectory data based on the trajectory images;
   determining a trajectory of the golf ball travelling in the air based on the trajectory data;
   determining a club speed and a club angle distance based on the club swing data; and
   determining a distance travelled by the golf ball and estimate a landing location based on the trajectory, the club speed, and the club angle.

15. The method of claim 13, further comprising:
   using the camera to capture takeaway images of the golf club moves away from the golf ball and generate takeaway data;
   determining whether a club angle of the golf club is open or close in relation to the recommended swing path based on the takeaway data; and generating a takeaway notification on the display regarding whether the golf club is open or close in relation to the recommended swing path.

16. The method of claim 13, further comprising:
using the camera to capture ball images of the golf ball on a golf course and images of the golf course surrounding the golf ball to then generate ball data;
determining a course feature of the golf course based on the ball data;
determining a depth of the golf ball on the determined course feature based on the ball data; and
including the course feature and the depth of the golf ball in the generation of the recommendation data, wherein the recommendation data includes club recommendation and the recommended swing path.

17. The method of claim 13, further comprising:
using a wireless device to communicate with a radio navigation system to receive position data;
using the captured image of the field of view to determine a gazed location the player is looking at;
using the wireless device and the radio navigation system to determine a position of the gazed location;
using the wireless device and the radio navigation system to determine a current position of the user; and
determining a distance between the user and the gazed location.

18. The method of claim 13, further comprising:
storing golf course information and range data on a plurality of golf clubs in the memory;
wirelessly receiving position data on a current position of the user;
determining a distance between the current position of the player and a golf hole;
choosing one of the golf clubs based on the range data in the memory; and
using the display to recommend the chosen golf club.

19. The eyewear of claim 13, further comprising:
using the camera to capture ball images of the golf ball on a putting green and images of the putting green surrounding the golf ball to then generate putting image data;
determining contours of the putting green based on the putting image data;
determine a putting line based on the putting image data and the determined contours; and
including the putting line in the generation of the recommendation data, wherein the recommendation data includes at least one of a club recommendation and the recommended swing path, and player feet position.

20. A real-time golf recommendation system comprising:
an eyewear worn by a golf player, the eyewear including:
  a display;
  a camera for capturing images of a field of view of the player and generating image data based on the images, wherein the field image includes a golf ball;
  a first communication device electrically connected to the display;
a remote server including:
  a second communication device wirelessly connected to the first communication device to receive the image data;
  a memory electrically connected to the second communication device to receive the image data; and
  a processor electrically connected to the memory, the processor being programmed to:
    generate a hologram that is a first colored circle hologram on the display, and track stances and recommend stance based on club used and intended shot of the golf ball in response to alignment of the golf ball with the hologram and the golf ball is in an optimal position for a shot based on position of the golf ball, movement of the golf ball, and stance of the player, such that the hologram turns to a second colored circle after alignment of the hologram with the golf ball is complete;
    generate a silhouette of feet as a captured moving image of the feet of the player on the display based on the stance and a club, such that a position of the silhouette on the display changes in response to changing the club while a position of the display remains unchanged;
    generate recommendation data based on the image data, wherein the recommendation data includes a recommended swing path; and
    send the recommendation data to the display through the first and second commutation devices; wherein
  the display shows recommendation images based on the recommendation data, the recommendation images include the recommended swing path.

* * * * *